US011151345B2

(12) United States Patent
Kaehr et al.

(10) Patent No.: US 11,151,345 B2
(45) Date of Patent: Oct. 19, 2021

(54) POLARIZATION-BASED CODING/ENCRYPTION USING ORGANIC CHARGE-TRANSFER MATERIALS

(71) Applicants: National Technology & Engineering Solutions of Sandia, LLC, Albuquerque, NM (US); Joseph J. Reczek, New Albany, OH (US); Madeline Van Winkle, Berkeley, CA (US); Harper O. W. Wallace, Dallas, TX (US)

(72) Inventors: Bryan James Kaehr, Albuquerque, NM (US); Joseph J. Reczek, New Albany, OH (US); Madeline Van Winkle, Berkeley, CA (US); Harper O. W. Wallace, Dallas, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/154,220

(22) Filed: Jan. 21, 2021

(65) Prior Publication Data

US 2021/0165984 A1 Jun. 3, 2021

Related U.S. Application Data

(63) Continuation-in-part of application No. 16/200,413, filed on Nov. 26, 2018, now Pat. No. 11,010,651.

(51) Int. Cl.
*G06K 7/14* (2006.01)
*G06K 19/06* (2006.01)
*C09K 19/34* (2006.01)

(52) U.S. Cl.
CPC ........ *G06K 7/1417* (2013.01); *C09K 19/3483* (2013.01); *G06K 19/06037* (2013.01)

(58) Field of Classification Search
CPC .......... G06K 7/1417; G06K 19/06037; C09K 19/3483
USPC .................................... 235/462.05
See application file for complete search history.

(56) References Cited

U.S. PATENT DOCUMENTS

| 10,672,428 | B1 * | 6/2020 | Black | G11B 7/0045 |
| 2010/0321748 | A1 * | 12/2010 | Gladney | G11B 7/0062 359/7 |
| 2010/0322058 | A1 * | 12/2010 | Hutt | G11B 7/0065 369/103 |

FOREIGN PATENT DOCUMENTS

WO WO 9743289 A1 11/1997

OTHER PUBLICATIONS

Van Winkle, M. et al., "Direct-Write Orientation of Charge-Transfer Liquid Crystals Enables Polarization-Based Coding and Encryption," Scientific Reports, 2020, vol. 10, 15352, 9 pages.

(Continued)

*Primary Examiner* — Daniel A Hess
(74) *Attorney, Agent, or Firm* — Kevin W. Bieg

(57) ABSTRACT

A charge-transfer material enables patterning approach where the polarization angle in stand-alone films can be precisely defined at the single pixel level and reconfigured following initial alignment. This capability enables new routes for non-binary information storage, retrieval, and intrinsic encryption, and it suggests future technologies such as photonic chips that can be reconfigured using non-contact patterning.

18 Claims, 11 Drawing Sheets

(56) References Cited

OTHER PUBLICATIONS

Van Winkle, M. et al., "Laser Rewritable Dichroics through Reconfigurable Organic Charge-Transfer Liquid Crystals," Advanced Materials, 2018, vol. 30, 1706787, 6 pages.
Leight, K. R. et al., "Predictable Tuning of Absorption Properties in Modular Aromatic Donor-Acceptor Liquid Crystals," Chemistry of Materials, 2012, vol. 24, pp. 3318-3328.
Be, A. G. et al., "Strongly Dichroic Organic Films via Controlled Assembly of Modular Aromatic Charge-Transfer Liquid Crystals," Organic Letters, 2015, vol. 17, pp. 4834-4837.
Alvey, P. M. et al., "A Systematic Study of Thermochromic Aromatic Donor-Acceptor Materials," Journal of Organic Chemistry, 2010, vol. 75, pp. 7682-7690.
Reczek, J. J. et al., "Tunable Columnar Mesophases Utilizing $C_2$ Symmetric Aromatic Donor-Acceptor Complexes," Journal of American Chemical Society, 2006, vol. 128, pp. 7995-8002.
Kaafarani, B. R., "Discotic Liquid Crystals for Opto-Electronic Applications," Chemistry of Materials, 2011, vol. 23, pp. 378-396.
Alegria, F. C., "Bias of Amplitude Estimation using Three-Parameter Sine Fitting in the Presence of Additive Noise," Measurement, 2009, vol. 42, pp. 748-756.
Mogensen, P. C. and Gluckstad, J.,"A Phase-Based Optical Encryption System with Polarisation Encoding," Optics Communications, 2000, vol. 173, pp. 177-183.

\* cited by examiner

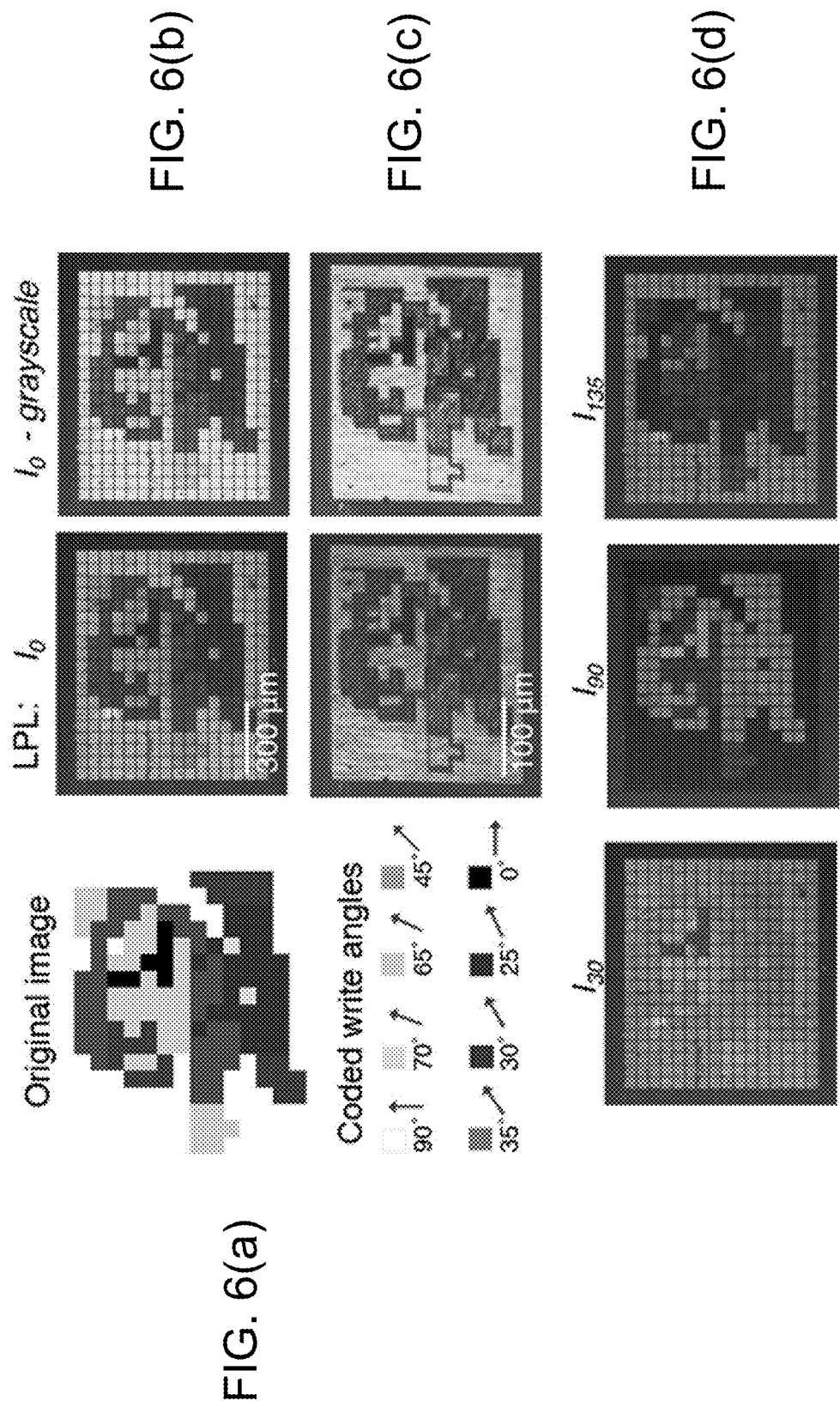

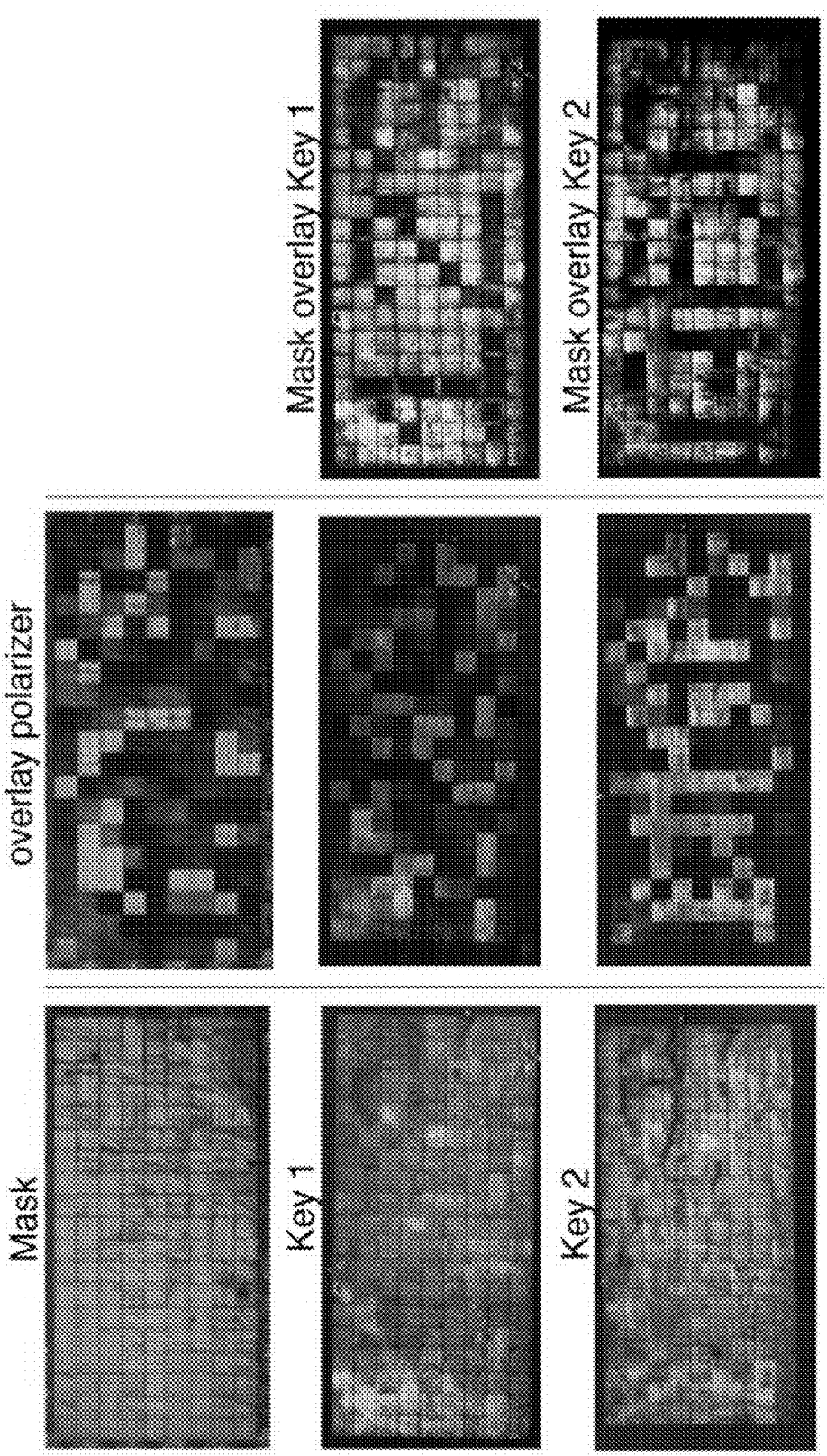

POLARIZATION-BASED CODING/ENCRYPTION USING ORGANIC CHARGE-TRANSFER MATERIALS

CROSS-REFERENCE TO RELATED APPLICATION

This application is a continuation-in-part of application Ser. No. 16/200,413, filed Nov. 26, 2018, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to optical coding and, in particular, to the polarization-based coding/encryption of organic charge-transfer materials.

STATEMENT REGARDING PRIOR DISCLOSURES BY THE INVENTOR OR A JOINT INVENTOR

The following disclosure is submitted under 35 U.S.C. 102(b)(1)(A): Madeline Van Winkle, Harper O. W. Wallace, Niquana Smith, Andrew T. Pomerene, Michael G. Wood, Bryan Kaehr, and Joseph J. Reczek, "Direct-write orientation of charge-transfer liquid crystals enables polarization-based coding and encryption," *Scientific Reports* 10, 15352 (2020). The subject matter of this disclosure was conceived of or invented by the inventors named in this application.

BACKGROUND OF THE INVENTION

The ability to generate and distinguish polarized light has widespread utility—from animals that have evolved dichroic polarizers to orient to their surroundings using optical compasses, to various modern technologies including forensic instruments, photonic integrated circuits, and ubiquitous digital displays. See M. Dacke et al., *Nature* 401, 470 (1999). In its simplest incarnation, a polarizer is an anisotropic arrangement of material, such as a grid of parallel wires. See E. Hecht, *Optics*, pages 333-334 and 371-372 (Addison Wesley, 2002). For polarizers operating at visible wavelengths, atoms, molecules or nanoparticles are aligned on a surface or in a film, selectively absorbing or reflecting orientations of light that are parallel to their alignment. This common configuration is used for the majority of polarizing films found in sunglasses and window coatings and, in general, is used to produce relatively large area static films. For example, in typical liquid crystal displays (LCDs), static cross-polarizers sandwich an electronically addressable liquid crystal layer. See E. Hecht, *Optics*, pages 333-334 and 371-372 (Addison Wesley, 2002). In this case, the liquid crystals (LCs) become polarized in the presence of an electric field, leading to LC alignment and pixel interpretation (i.e., on/off, grayscale) that is contingent on the properties (size, shape, switching speed) of the underlying patterned electrodes. However, if polarization and LC alignment could be continuously varied in the absence of these constraints, a single pixel could provide a grayscale transmission response under a set illumination, dramatically increasing the information storage capacity from binary (1 bit) to continuously variable (analog).

Changing the orientation of a polarizer at the scale of a 'pixel' (tens of microns) is not generally considered given the fabrication approaches for polarized films and optics and the geometric constraints of planar electrodes used to control LC orientation in devices. See E. Lueder, *Liquid crystal displays: addressing schemes and electro-optical effects*, pages 3-18 (Wiley, 2010). Thus grayscale transmission (e.g., for optical encryption) requires multiple LC layers, optical elements and polarizers to interact along the optical path. See P. C. Mogensen and J. Glückstad, *Opt. Commun.* 173, 177 (2000); T. Y. Chung et al., *Sci. Rep.* 8, 1 (2018); J. A. Davis et al., *Appl. Opt.* 39, 1549 (2000); H.-Y. Tu et al., *J. Opt. A: Pure Appl. Opt.* 6, 524 (2004); X. Li et al., *Nat. Commun.* 3, 1 (2012); T. Imagawa et al., *Jpn. J. Appl. Phys.* 48, 09LC02 (2009); I. Moreno et al., *Opt. Express* 20, 364 (2012); and X. Zhao et al., *Opt. Express* 18, 17776 (2010). Advances in nano-scale periodic materials for precise control of electromagnetic propagation (i.e., metasurfaces) can enable on-chip polarization control, though typically with narrow bandwidth and limited ability for reconfiguration or control of angle, with few exceptions. See L. Zhang et al., *Adv. Opt. Mater.* 4, 818 (2016); S. Wu et al., *Phys. Rev. Lett.* 110, 207401 (2013); C.-p. Huang et al., *Appl. Phys. Express* 10, 112201 (2017); and Y. Zhang et al., *J. Opt.* 22, 035101 (2020). Wire-grid type polarizers built from polymers, nanotubes, nanowires, and etched metal gratings improve performance beyond traditional polarized films (derived from H-sheet polarizers) but use bulk/large area approaches for alignment. See E. Peeters et al., *Adv. Mater.* 18, 2412 (2006); B. M. Oosterlaken et al., *Adv. Funct. Mater.* 30, 1907456 (2020); M. Jung et al., *Adv. Mater. Technol.* 3, 1800203 (2018); S. Kwon et al., *Nanoscale* 8, 15850 (2016); J. Kang et al., *Adv. Opt. Mater.* 6, 1800205 (2018); and E. H. Land, *J. Opt. Soc. Am.* 41, 957 (1951). Local alignment of LCs can be achieved with optical resolution by photo-aligning substrates that dictate the pre-tilt angle and with site-specific accuracy using direct laser writing, but these approaches do not afford reconfigurability. See J. Y. Ho et al., *Appl. Phys. Lett.* 90, 243506 (2007); E. A. Shteyner et al., *Soft Matter* 9, 5160 (2013); H. Wu et al., *Opt. Express* 20, 16684 (2012); C. C. Tartan et al., *Adv. Opt. Mater.* 6, 1800515 (2018); and J. Kim et al., *Optica* 2, 958 (2015).

SUMMARY OF THE INVENTION

The present invention uses an organic charge-transfer material set and patterning approach to fabricate complex rewritable optical polarizers using precision laser-scanning. This technique enables adaptable micron-scale control over optical polarization, which can be interrogated using application-specific resolution parameters. This variable functionality lends rewritable charge-transfer materials to multiple applications including data storage, retrieval and encryption as demonstrated herein. Specifically, the invention provides for a method for reading an optical code, a method for optical encryption, and a method for optical encryption using organic charge-transfer films. Finally, the ability to chemically build in the lifespan of the patterned material provides additional protection for encoded information and optical functions.

The method for reading an optical code comprises optically encoding a grayscale image intended to be viewed with a chosen angle of linearly polarized light in an organic charge-transfer film, wherein the encoding comprises providing a film comprising an organic charge-transfer material, and writing a pattern within the film with an optical source, in which the pattern comprises at least two different dichroic regions, wherein each of the at least two different dichroic regions is written with a different write angle; illuminating the film with linearly polarized light at the chosen angle; and viewing the light transmitted through the film to reveal the encoded grayscale image. Each dichroic region comprises an optically anisotropic phase comprising a plurality of domains arranged in an aligned columnar phase characterized by a columnar director. The different write angles provide each different dichroic region with a columnar director that is different from the columnar director of each of the other dichroic regions.

The method for optical encryption comprises providing a mask comprising a film of an organic charge-transfer material having a pattern optically written within the film, wherein the pattern comprises one or more dichroic pixels, wherein each of the one or more dichroic pixels is written with a different write angle, and wherein the one or more dichroic pixels are written to contain encrypted information; providing a key comprising a film of an organic charge-transfer material having a pattern optically written within the film, wherein the pattern comprises one or more dichroic pixels, wherein each of the one or more dichroic pixels is written with a different write angle, and wherein the one or more dichroic pixels are written to decrypt the encrypted information in the mask; overlaying the mask and the key to overlay the pixels of the mask with the pixels of the key; and illuminating the overlaid mask and key with unpolarized light so as to transmit light through overlaid mask and key pixels with similar write angles and block light transmission through overlaid mask and key pixels with orthogonal write angles, thereby revealing the information in a transmitted image. Each dichroic pixel comprises an optically anisotropic phase comprising a plurality of domains arranged in an aligned columnar phase characterized by a columnar director. The different write angles provide each different dichroic pixel with a columnar director that is different from the columnar director of each of the other dichroic pixels.

The method for encoding and retrieving a message comprises providing a film comprising an organic charge-transfer material; writing an arrangement within the film with an optical source, in which the arrangement comprises a plurality of dichroic cells, wherein each of the plurality of dichroic cells is written with a different write angle from each of the other dichroic cells in the arrangement, thereby encoding a message; pairing dichroic cells having different dichroic orientation to provide a plurality of unique dyads, each storing a different data state; coding each unique dyad to a text character; independently imaging the light transmitted by the arrangement when the film is illuminated by incident linearly polarized light at each of at least three different illumination angles; determining the write angle for each of the dichroic cells from the at least three independent grid images, thereby identifying the unique dyads that contain the encoded message; and decoding the message by determining the text character for each of the identified unique dyads. Each dichroic cell comprises an optically anisotropic phase comprising a plurality of domains arranged in an aligned columnar phase characterized by a columnar director. The different write angles provide each different dichroic cell with a columnar director that is different from the columnar director of each of the other dichroic cells.

BRIEF DESCRIPTION OF THE DRAWINGS

The detailed description will refer to the following drawings, wherein like elements are referred to by like numbers.

FIG. 6(a) shows a target image (top) and write angles corresponding to distinct grayscale values of the image pixels (bottom). FIG. 6(b) is an M-LPI image of a DACLC film encoded with uniform pixels. FIG. 6(c) is an M-LPI image of a DACLC film encoded with regional pixels at $\theta_{LPL}$=0°. Both figures are also shown in grayscale to demonstrate close similarity to the original image. FIG. 6(d) shows M-LPI images of the pixel-wise encoded film at $\theta_{LPL}$=30°, 90°, and 135°.

FIG. 7(a) shows microscope images of a mask and keys viewed with no polarizing filter. FIG. 7(b) shows microscope images the mask and keys viewed under a single polarizing filter. FIG. 7(c) is an expansion of Mask-Key overlay showing a single Mask is overlaid with "Key 1" and then "Key 2" to reveal the independent messages "123" and "ABC" respectively.

FIG. 9(a) illustrates images of film A:D2 showing major loss of optical contrast between written regions (data integrity) in just 2 days, and significant loss of contrast after 10 days under ambient conditions. FIG. 9(b)

illustrates images of film A:D1 showing no statistical loss of contrast is observed at 10 days.

DETAILED DESCRIPTION OF THE INVENTION

Figure 1:
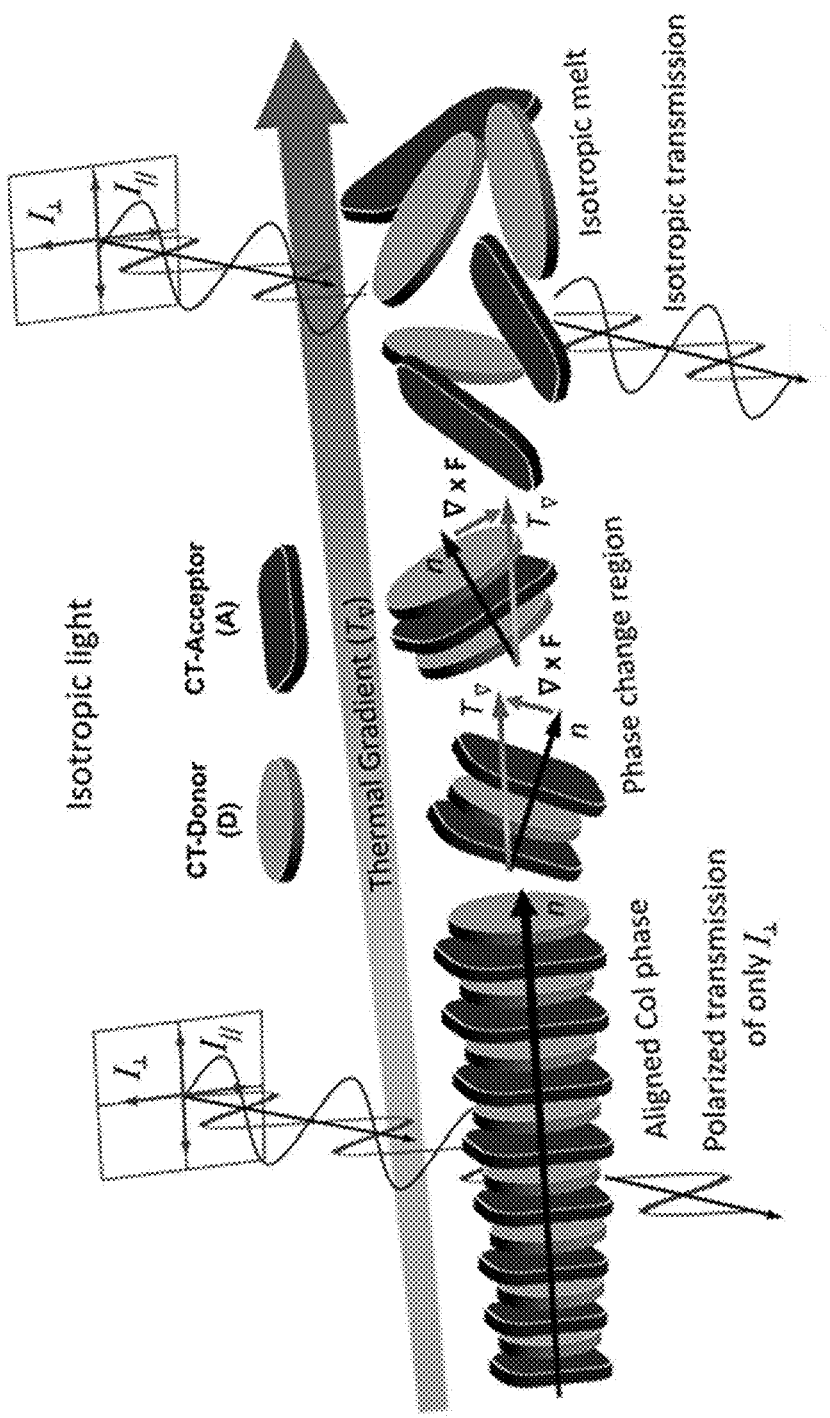
FIG. 1 is a schematic illustration of light polarization by aligned donor-acceptor columnar liquid crystals (DACLCs). Fine control of columnar alignment can be achieved via laser-induced thermal gradient.

The ability to locally orient the alignment of charge-transfer (CT) materials using an optical direct-write technique to provide an optical code has been described in U.S. application Ser. No. 16/200,413, filed Nov. 26, 2018, which is incorporated herein by reference. See also M. Van Winkle et al., Adv. Mater. 30, 1706787 (2018). Of particular note are bicomponent CT materials referred to as donor-acceptor columnar liquid crystals (DACLCs). By directionally controlling this melt/cool response using a scanning laser passing over a DACLC film, the irradiated region can be rendered isotropic (with rapid cooling) or strongly anisotropic (with slower cooling). When cooled slowly from a melt, the charge-transfer donor/acceptor components (CT-Donor (D) and CT-Acceptor (A)) of the DACLCs self-assemble to form strongly dichroic, rod-like stacks of donor-acceptor domains in an aligned columnar phase (Aligned Col phase), as shown in FIG. 1. The laser induces columnar order by generating a thermal gradient ($T_\nabla$) which causes a torque ($\nabla \times F$) to act on the columnar director (n) of a cooling phase change region and thereby align the donor-acceptor domains in the plane of $T_\nabla$ (i.e., in the direction of laser writing). If the donor and acceptor components are aligned by way of directed π-π stacking that maximizes donor to acceptor interactions, then the stacking direction will be orthogonal to the plane of the aromatic groups providing such stacking interactions. In this scenario, the columnar director n will be orthogonal to the plane of aromatic groups. In principle, the relative orientation of aligned columns can be arbitrarily dictated using this approach simply by adjusting the direction of the thermal gradient. A wide area of a DACLC film can be aligned by moving a scanning laser line in relation to the substrate, resulting in a large region of horizontally oriented columnar domains. These DACLC materials exhibit intense and broadly tunable CT absorbance in the visible—NIR. However, the characteristic CT absorption is observed only in the direction of π-π stacking of the donor-acceptor domains. Therefore, when exposed to linearly polarized light (LPL), CT absorption only occurs if the direction of the electric field vector is parallel ($I_\parallel$) to the columnar director n and transmission only occurs if the electric field vector is perpendicular ($I_\perp$) to the columnar director n of the aligned Col phase. Thus, aligned DACLCs can act as highly anisotropic absorbers of light oriented parallel to columnar alignment, often achieving dichroic ratios ($\alpha_\parallel/\alpha_\perp$)>30 in the CT region. See A. G. Bé et al., Org. Lett. 17, 4834 (2015).

Organic Charge-Transfer Materials

Figure 2A:
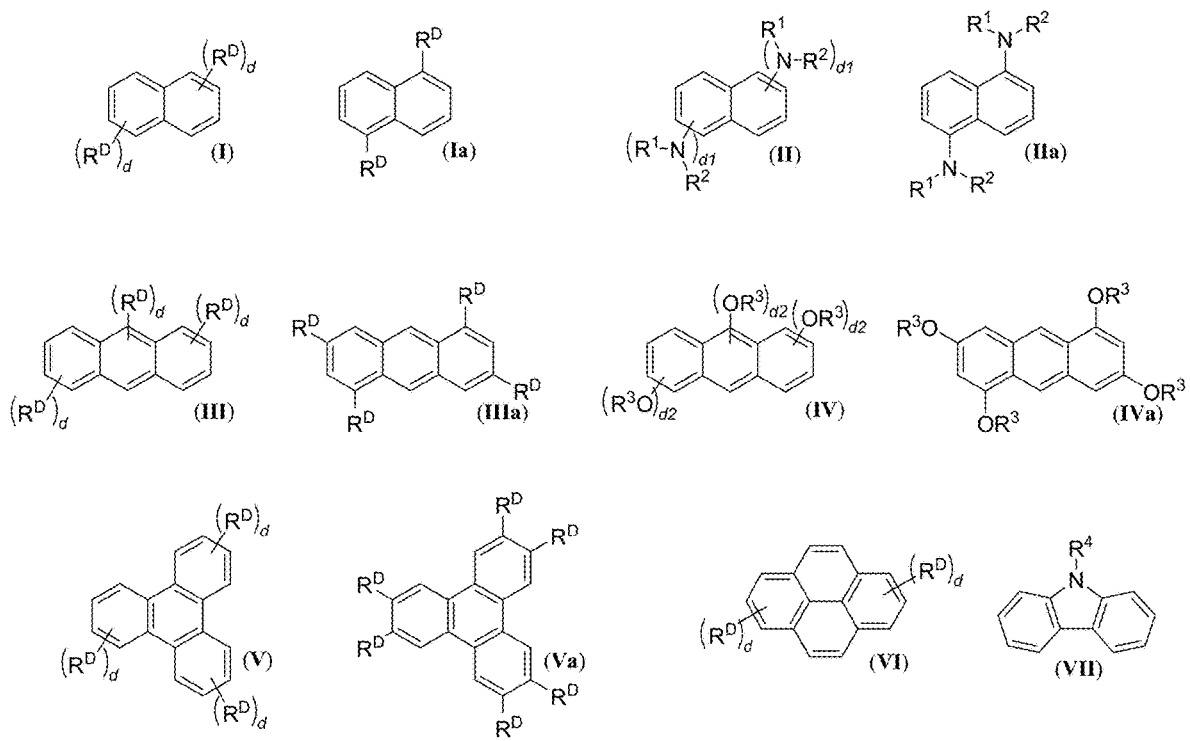
FIGS. 2(a)-2(b) provides exemplary chemical structures of (a) donor moieties (structures (I), (Ia), (II), (IIa), (III), (IIIa), (IV), (IVa), (V), (Va), (VI), and (VII)); and (b) acceptor moieties (structures (VIII), (IX), (X), (XI), (XII), and (XIII)).
Figure 2B:
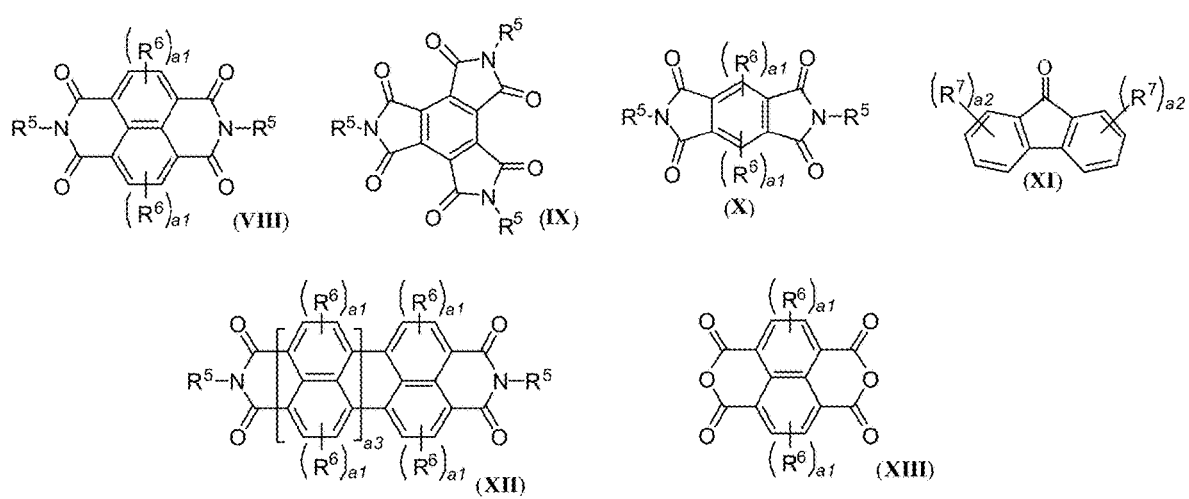

In general, the present invention can use any organic CT material comprising components (or compounds or moieties) that are capable of forming an aligned columnar phase. In one instance, the CT material includes a plurality of domains, wherein each domain includes a donor moiety (e.g., an electron-rich aromatic) and an acceptor moiety (e.g., an electron-poor aromatic). FIG. 2(a) provides exemplary structures for a donor moiety, including a structure of any one of (I), (Ia), (II), (IIa), (III), (IIIa), (IV), (IVa), (V), (Va), (VI), and (VII), or a salt thereof. For any of these structures, $R^D$ can be H or an electron-rich substituent (e.g., in which at least one $R^D$ is an electron-rich substituent). Exemplary $R^D$ (e.g., for (I), (Ia), (III), (IIIa), (V), (Va), and (VI), or a salt thereof) can include H, optionally substituted alkyl, heteroalkyl, cycloalkyl, alkoxy, alkylcarbonyloxy, amino, aryl, alkaryl, alkanoyl, thioalkoxy, thioaryloxy, thioalkaryl, thioalkheterocyclyl, or hydroxyl; and/or each of d is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4). For any of these structures (e.g., (II), (IIa), (IV), (IVa), and (VII) or a salt thereof), each of $R^1$ and/or $R^2$ and/or $R^3$ and/or $R^4$ is, independently, H, optionally substituted alkyl, heteroalkyl, cycloalkyl, aryl, alkaryl, or alkanoyl; and/or each of d1 and d2 is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4). FIG. 2(b) provides exemplary structures for an acceptor moiety, including a structure of any one of (VIII), (IX), (X), (XI), (XII), and (XIII), or a salt thereof. For any of these structures, each $R^5$ can be H, optionally substituted alkyl, heteroalkyl, cycloalkyl, aryl, alkaryl, or alkanoyl. For these structures, exemplary $R^6$ (e.g., for (VIII), (X), (XII), and (XIII), or a salt thereof) can include H, optionally substituted alkyl, heteroalkyl, cycloalkyl, aryl, or alkaryl; and/or each of a1 and a2 is, independently, an integer from 0 to 4 (e.g., 0 to 1, 0 to 2, 0 to 3, 0 to 4, 1 to 4, 1 to 3, 1 to 2, 2 to 3, 2 to 4, and 3 to 4); and/or a3 is an integer from 0 to 5. For these structures, exemplary $R^7$ (e.g., for (XI), or a salt thereof) can include H, halo, nitro, or cyano. Additional CT materials, donors, and acceptors are described in U.S. application Ser. No. 16/200,413; K. R. Leight et al., Chem. Mater. 24, 3318 (2012); A. G. Bé et al., Org. Lett. 17, 4834 (2015); P. M. Alvey et al., J. Org. Chem. 75, 7682 (2010); J. J. Reczek et al., J. Am. Chem. Soc. 128, 7795 (2006); M. Van Winkle et al., Adv. Mater. 30, e1706787 (2018); B. R. Kaafarani, Chem. Mater. 23, 378 (2011); J. J. Reczek, "Aromatic electron donor-acceptor interactions in novel supramolecular assemblies," Ph.D. dissertation, University of Texas, Austin, (2006); and International Patent Publication No. WO 97/43289, each of which is incorporated herein by reference in its entirety.

Writing of Optical Code

The present invention enables writing of optical code resulting from precise control over the angle of columnar alignment in CT films and the corresponding polarization of transmitted light. This optically written molecular assembly allows for optically anisotropic, dichroic regions or pixels with discrete polarization that can be distinguished on a micron-scale. The practical relevance of this molecular system is illustrated through the optical writing and reading of images and data in CT films. Importantly, the inventive alignment technique results in patterned areas that are easily re-written using a non-contact (e.g., electric field independent) approach, retain optical functionality as standalone films, and have synthetically tunable rates of degradation, providing independent control over the retention time of stored information. Further, the analog response of the system increases the density of information retrieved from a coded pixel compared to traditional digital methods, while also illustrating new modes of passive data encryption.

Figure 3A:
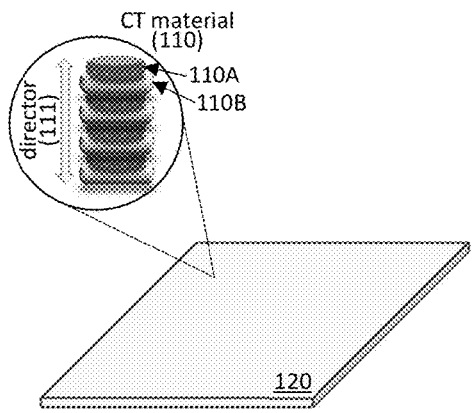
FIGS. 3(a)-3(b) show schematics of exemplary films and patterned codes disposed within a film. Provided are (a) an exemplary film 120 including a charge-transfer (CT) material 110 and (b) an exemplary method for providing a patterned code 140 disposed within a film.

FIG. 3(a) illustrates an exemplary film 120 formed from a CT material 110 having a plurality of stacked domains. Each domain includes a donor 110A and an acceptor 110B pair, and a plurality of domain pairs can be aligned to form an aligned columnar phase. The direction of alignment can be characterized by a columnar director 111, which is parallel to the stacking direction of the domains.

Upon providing a film composed of a CT material, an optical code can be written by exposing the film to an optical source to provide a pattern disposed within the film. The composition of the pattern can depend on the initial phase of the film. As described herein, exposure to an optical source (depending on experimental conditions, such as write speed or translation speed of the optical source, the temperature of the optical source, the thermal gradient imposed within the film, the direction of translation, etc.) can provide either an ordered phase or a disordered phase. Overall, the optical source induces a temperature gradient within the film. The magnitude and spatial distribution of this gradient, in combination with the inherent cooling rate of the exposed region, controls the extent of columnar ordering. For instance, an ordered phase can be written by providing a sufficient thermal gradient or a sufficient cooling time (e.g., by employing moderate writing speeds, such as from about 0.1 to about 0.5 mm s$^{-1}$), thereby providing long-range columnar order. For instance, a disordered phase can be written by providing a sharp thermal gradient or rapid cooling (e.g., by employing fast writing speeds, such more than about 0.5 mm s$^{-1}$), thereby providing disrupted regions.

Figure 3B:
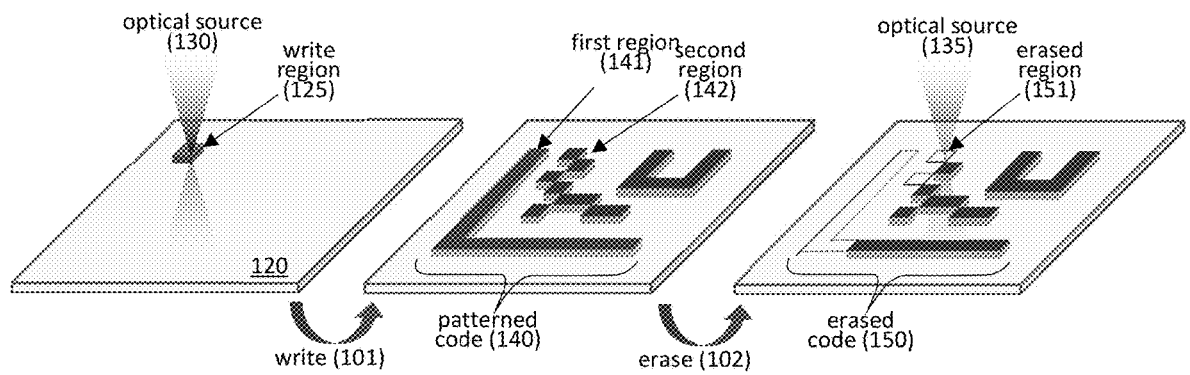

FIG. 3(b) provides an exemplary method for writing an optical code. The writing method can include providing a film 120 comprising a charge-transfer material; and exposing the film to a first optical source 130 to provide a pattern (e.g., a patterned code 140) disposed within the film, in which the pattern comprises a plurality of regions or pixels (e.g., write region 125). The exposing step can result in writing 101 of the pattern into the film, thereby providing an optical code.

As can be seen, the exemplary patterned code 140 includes a pattern having first regions 141 and second regions 142. In one embodiment, the first and second regions are different, in which the difference can be the extent of anisotropy-isotropy or the direction of the director (if both regions exhibit some amount of alignment or anisotropy). As described herein, the optical source can write either an ordered region (e.g., an anisotropic phase) or a disordered region (e.g., an isotropic phase). Thus, an initial ordered film can be written with disordered regions, just as easily as an initial disordered film can be written with ordered regions. Accordingly, in one embodiment, if the first region is a write region including an ordered region (e.g., an anisotropic phase), then the second region can include a disordered region (e.g., an isotropic phase, in which the film can then possess an initial disordered phase). In another embodiment, if the first region is a write region including a disordered region (e.g., an isotropic phase), then the second region can include an ordered region (e.g., an anisotropic phase, in which the film can then possess an initial aligned columnar phase).

The method can further include optionally erasing 102 the patterned code 140 by exposing the pattern to a second optical source 135. For instance, erasing can be accomplished by treating the patterned code with an optical source to provide a uniform phase, either a uniform ordered region (e.g., an anisotropic phase) or a uniform disordered region (e.g., an isotropic phase). Thus, rather than using a spatial pattern to determine which areas of the film to treat in a certain manner, the entire film is treated with a uniform condition to provide a uniformly aligned (or misaligned) region. The erased region 151 including the erased code 150 can then be used as a film upon which another pattern can be written. In this manner, an optical code can be rewritten on the same film.

Figure 4A:
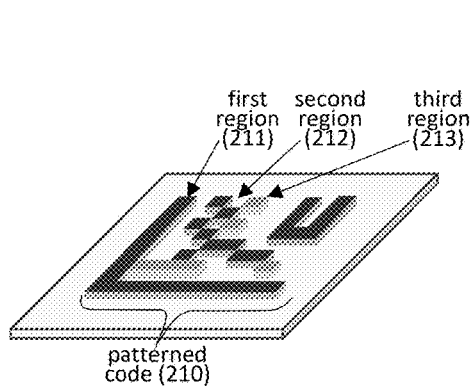
FIGS. 4(a)-4(b) show schematics of (a) an exemplary patterned code 210 having various regions and (b) an exemplary diagram of the code showing various regions.
Figure 4B:
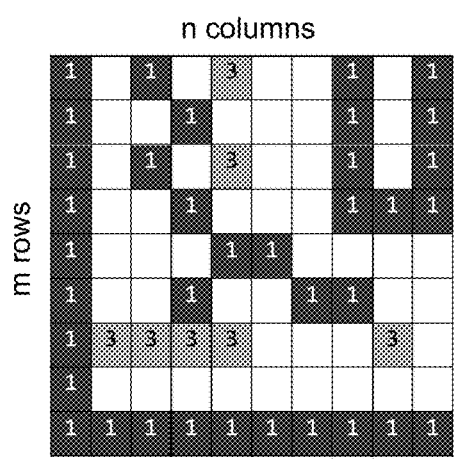

The pattern can include a plurality of regions or pixels, in which each region or pixel is encoded as one of a first region or a second region (e.g., in which each can be one of a disordered phase or an ordered phase). Alternatively, each region is encoded as one of a first region, a second region, or a third region, in which each can be one of a disordered phase, a first ordered phase, or a second ordered phase. The first and second ordered phase can be characterized by a different columnar director. In this way, the different dichroic regions will polarize light differently because the columnar directors are different. In this way, rather than binary codes, gray scale codes can be implemented with the optical codes described herein. FIG. 4(a) shows an exemplary patterned code 210 having a pattern with at least three different regions: a first region 211, a second region 212, and a third region 213. In one non-limiting embodiment, the first region is an ordered phase having a first columnar director; the second region is a disordered phase; and the third region is an ordered phase having a second columnar director that is different than the first columnar director (e.g., in which the first and second columnar directors are orthogonal or not parallel). In general, the patterned code can comprise any number of such dichroic regions or pixels having different columnar directions. FIG. 4(b) shows an exemplary pattern shown as a matrix having m rows and n columns of pixels, in which each pixel within the matrix can be construed at as a bit having a value of 1 (first pixel), null (second pixel), or 3 (third pixel).

Synthesis of Donor-Acceptor Columnar Liquid Crystals

As an example of the invention, two different DACLC materials were characterized, each consisting of a N,N'-dioctyl naphthalenediimide acceptor (A) with either a 1,5-di-propyl-aminonapthalene donor (D1) or a 1,5-di-hexyl-aminonapthalene donor (D2). These compounds were synthesized following published procedures. See K. R. Leight et al., Chem. Mater. 24, 3318 (2012). To synthesize N,N'-dioctyl-naphthalenediimide (NDI), 1,4,5,8-naphthalenetetracarboxylic dianhydride (1.0 g, 3.4 mmol) was placed into a round bottom flask and suspended in isopropanol (80 ml). A mixture of 1-aminooctane (1.6 g, 12.4 mmol), triethylamine (1.3 g, 13 mmol), and isopropanol (30 ml) was slowly added and the solution was allowed to stir at room temperature for 30 min, and then heated at reflux for 16 hours. The solution was allowed to cool to room temperature and the resulting precipitate was filtered and recrystallized in isopropanol to yield NDI (1.6 g, 94% yield) as off-white crystals. To synthesize N1,N5-dihexylnaphthalene-1,5-diamine (DAN, D2), naphthalene-1,5-diamine (1.00 g, 6.32 mmol), 50 mL of acetone, and $K_2CO_3$ (5.24 g, 37.93 mmol) were added in a round bottom flask. The reaction was refluxed and stirred for 30 minutes. Then 1-bromohexane (6.78 g, 41.09 mmol) was added and continued to reflux for 72 hours. Acetone was removed in vacuo and the crude product was purified by column chromatography in DCM: hexanes (7:3 Hex:DCM). The eluting solvent was removed in vacuo, and the product was further purified by crystallization in isopropanol to yield light-purple needle-like crystals of DAN (0.6 g, 30% yield). DACLC mixtures were made by weighing out the correct molar ratio of components, and then physically mixing with a spatula prior to melting with a heat gun. The resulting mixture was iteratively corrected using $^1$H NMR until integration of the respective donor and acceptor peaks gave a ratio of 1.00 to 1.00 (±0.02).

Patterned Control of Light Polarization

Figure 5A:
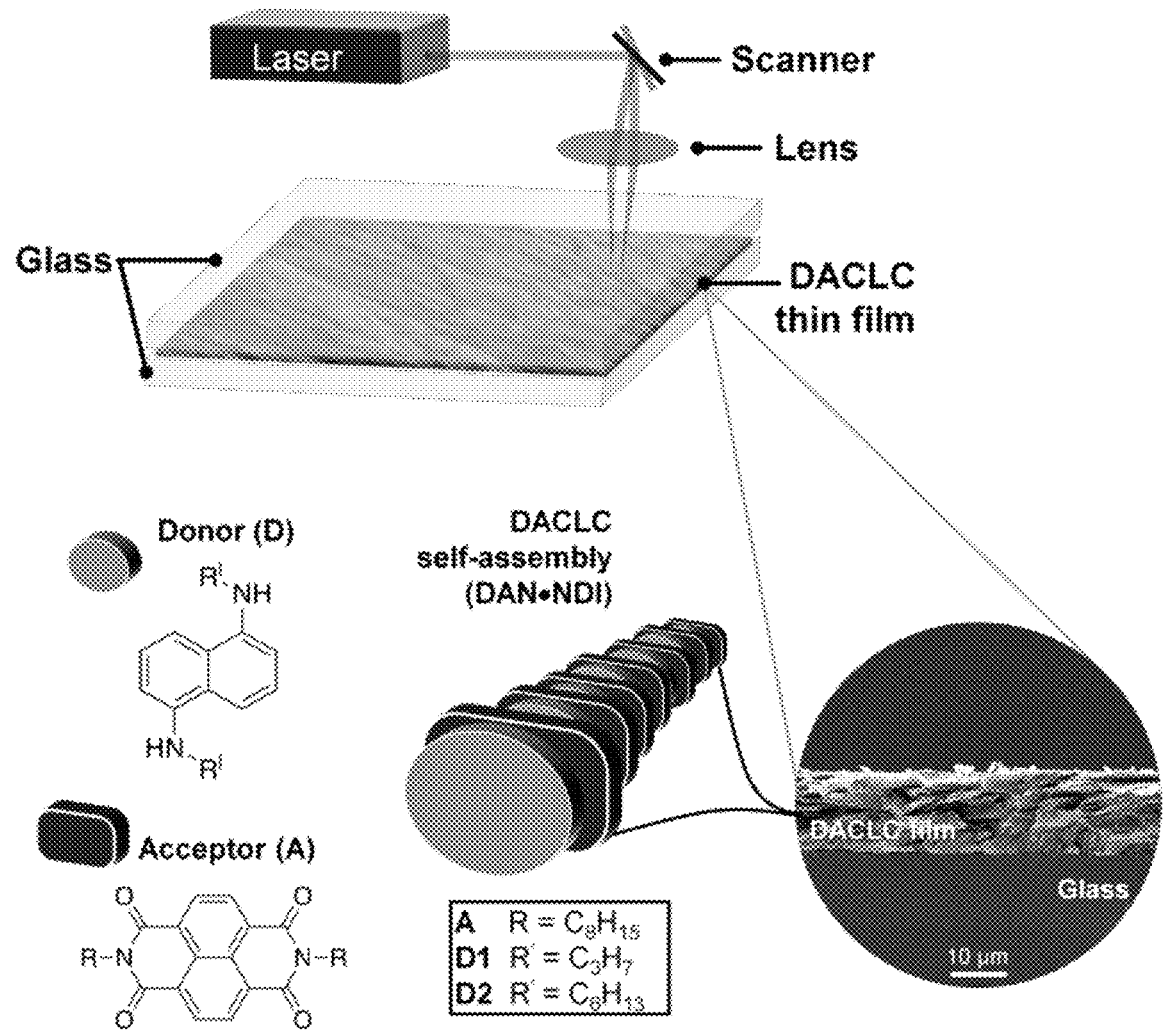
FIG. 5(a) is a schematic illustration of a laser writing setup. A 780 nm beam is focused into a thin (12-20 µm) DACLC film to induce melting at the point of focus. The diagram illustrates columnar phase stacking of alternating DAN•NDI molecules, and SEM cross-section of a film.

Laser writing tests were performed on DACLC thin films sandwiched between glass substrates, melted, and then allowed to cool at 2° C./min to room temperature. The sandwiched DACLC films were mounted into a scanning laser setup, as shown in FIG. 5(a). Patterns were written into DACLC films using the NanoScribe GmbH Photonic Professional GT 3D printer equipped with a 20× Zeiss EC Epiplan-Neofluar 0.50 NA objective and adjusting the power, scan speed and hatch angle of the scanning beam to control the degree and direction of columnar alignment in each pixel. Isotropic regions were written using a 50 mm/s laser scan speed and 40-60% of maximum laser power. Depending on the size of the pixel/scanning region, anisotropic areas were written using a 1.5-3.5 mm/s scan speed and 10-12% of maximum laser power, with the resultant polarization direction perpendicular to the hatching direction (thus parallel to the direction of the thermal gradient produced by the laser).

Figure 5B:
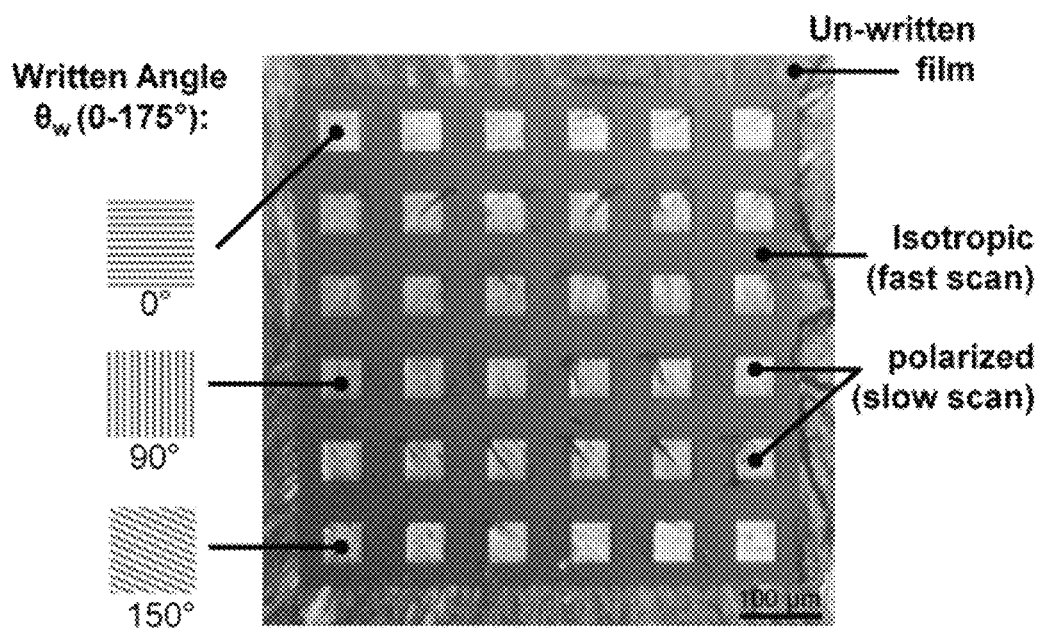
FIG. 5(b) is an image of a DACLC film patterned with a 6×6 grid of 50×50 µm regions aligned at 5° increments from 0°-175° over an isotropic background (imaged using unpolarized light).
Figure 5C:
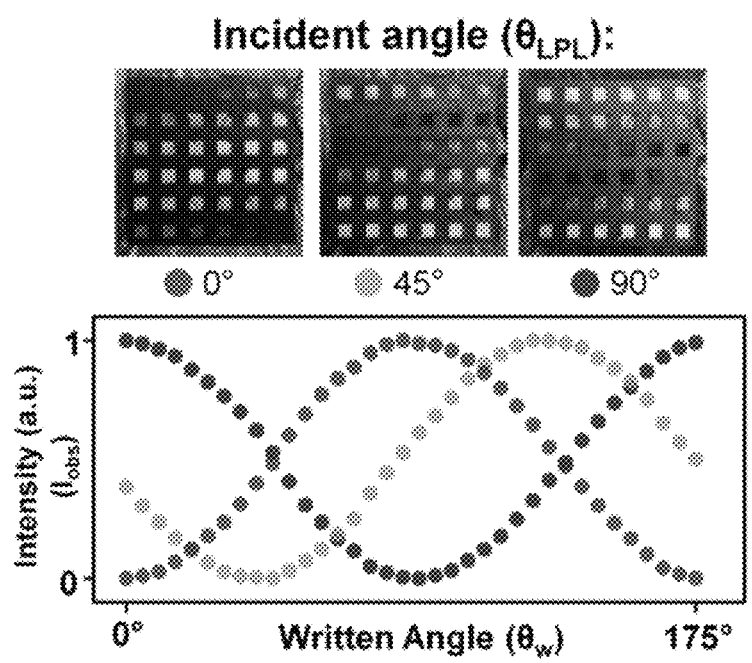
FIG. 5(c) are M-LPI images of patterned film from FIG. 5(b) taken using $\theta_{LPL}$=0°, 45°, and 90°. Intensity of LPL transmitted ($I_{obs}$) through each aligned dichroic region is plotted as a function of the region's angle of columnar alignment ($\theta_w$) in accordance to Eq. (1) ($R^2$>0.97).

To examine the correlation between desired alignment of patterned DACLC films and the real polarization of transmitted light, an isotropic square was laser-patterned followed by re-writing areas within the square resulting in a 6×6 grid of 36 anisotropic regions aligned in intended increments of 5°, as shown in FIG. 5(b). Importantly, any region in the film can be (re)patterned using laser direct write as well as "reset" by heating the film above the DACLC isotropic transition temperature (~160° C.), as described in U.S. application Ser. No. 16/200,413; and M. Van Winkle et al., Adv. Mater. 30, 1706787 (2018). The resulting grids were imaged using optical microscopy with linearly polarized illumination (M-LPI) with the incident light oriented at 0, 45, and 90° ($\theta_{LPL}$), as shown by the images in FIG. 5(c). The images were recorded using a CCD camera mounted on an inverted stage microscope illuminated using a single polarizer. The images were analyzed to quantify the intensity of linear polarized light (LPL) transmitted ($I_{obs}$) through each aligned region, plotted as a function of the written angle ($\theta_w$) in the graph in FIG. 5(c). When reading the images, rotating the incident angle of LPL by 90° with respect to the written angle maximizes the transmitted light. A sinusoidal relationship between $\theta_w$ and $I_{obs}$ is apparent in each plot, exhibiting the same behavior as light passed between two in-line polarizers ($\theta_{p1}$ and $\theta_{p2}$) according to Eq. 1 (Malus' law). Substituting $\theta_{LPL}$ and $\theta_w$ for $\theta_{p1}$ and $\theta_{p2}$, respectively, in Eq. 2, Malus' law directly applies to laser-aligned DACLCs where k is related to the dichroic ratio of the film and b is a baseline correction due to "dark" transmission. This illustrates that the laser-aligned DACLC regions effectively act as independently written polarizers.

$$I_{obs}=I_1\cos^2(\theta_{p1}-\theta_{p2}) \quad (1)$$

$$I_{obs}=kI_1\cos^2(\theta_{LPL}-\theta_w)+b \quad (2)$$

The correlation between written DACLC alignment and resultant LPL transmission can be used to control the relative intensity of DACLC regions with respect to incident LPL angle. This ability to precisely pattern LPL transmission affords a mechanism for inscribing information into a film, which can be correctly interpreted only at an intended $\theta_{LPL}$. To explore this concept, an 8-bit image was encoded in a DACLC film, designed to be viewed with a specific $\theta_{LPL}$. Gradation in the magnitude of the dichroic ratio between 0 and 90 degrees enables an analog-like readout of each DACLC pixel. As shown in FIG. 6(a), each distinct grayscale level of the original 8-bit image was associated with a unique write angle ($\theta_w$) based on the predicted LPL transmission through a DACLC pixel for the chosen $\theta_{LPL}$ (in this case, $\theta_{LPL}=0°$). Using a readout mechanism based on polarization-dependent transmittance coupled with the ability to define the input polarization orientation greatly increases the possible permutations for a given pixel, which can be advantageous for data storage, authentication, and cryptography applications.

Two approaches for optically encoding a grayscale image into a DACLC film are illustrated. The first directly transposes each pixel of the original image to a specific region in the DACLC film, in this case a 50×50 μm square, as shown in FIG. 6(b). Each dichroic pixel is independently written with one of the eight coded alignments. The image is viewed as the compilation of discretely aligned DACLC pixels. Alternatively, original image pixels of the same shade can be grouped and patterned as a continuous region on the DACLC film, as shown in FIG. 6(c). The latter can allow for more complex patterning and smaller feature resolution (<10 μm) as aligned regions are no longer pixelated and can take any size or form. However, an isotropic border remains visible between neighboring regions, which is attributed to overlap of the laser-scanned regions. As noted above, the encoding of $\theta_w$ (in this case to represent relative shading) is specific to an intended viewing polarization, $\theta_{LPL}$. When either of the two written films are viewed at the intended LPL angle ($\theta_{LPL}=0°$), the original image is clearly represented with the proper grayscale levels. However, viewing the film at different LPL orientations yields "washed-out" images of poorer contrast ($\theta_{LPL}=30°$, 135°) or an image with inverted grayscale levels ($\theta_{LPL}=90°$), as shown in FIG. 6(d). In other words, accurate interpretation of the information encoded into the DACLC film is contingent upon viewing the film with an intended input polarization angle.

Unlike traditional polarizing films, discrete dichroic regions of DACLC films can be independently oriented, and re-oriented, down to the micron scale. Considering a case of two overlapping DACLC films, $\theta_{LPL}$ and $\theta_w$ (Eq. 2) is replaced by $\theta_{w1}$ and $\theta_{w2}$ (Eq. 3), resulting in a unique intercorrelated value of $I_{obs}$ for each pixel.

$$I_{obs}=kT_1\cos^2(\theta_{w1}-\theta_{w2})+b' \quad (3)$$

Together these features allow for optical encryption schemes that take advantage of overlaid polarizers. See P. C. Mogensen and J. Glückstad, Opt. Commun. 173, 177 (2000). As a demonstration, arbitrarily aligned dichroic pixels were written in a film serving as an encrypted "mask", with a second film, the decrypting "key", written relative to the mask so that output information is revealed only upon correct overlay of the two films. On overlay, bright transmission of unpolarized light corresponds to overlaid aligned pixels with similar orientation ($\theta_{w1}\approx\theta_{w2}$), while orthogonal pixels ($\theta_{w1}\approx\theta_{w2}+90°$) appear dark. Importantly, no intelligible information can be obtained from either the mask or key films independently, using unpolarized or polarized light, as shown in FIGS. 7(a) and (b); the encrypted information is only revealed on mask-key overlay, as shown by the upper image labeled "Mask overlay Key 1" in FIG. 7(c). In addition, more than one key can be designed to work with a given mask, meaning that one mask can be used to view different messages, as shown by the lower image labeled "Mask overlay Key 2" in FIG. 7(c). This scheme enables fast and low-cost authentication, useful for documents, currency, supply chains, etc.

Information Resolution, Encoding and Retrieval in a Single DACLC Film

The ability to achieve microscopic patterning of polarization provides opportunities for more complex methods of information encoding and retrieval. In place of a key overlay, the relative $\theta_w$ of written regions can be determined in a single film using M-LPI by fitting $I_{obs}$ at known values of $\theta_{LPL}$ using the phase determinant of Eq. 2 ($\theta_w = \theta_{LPL} - \pi/2$). Given the periodic relationship between DACLC alignment direction and LPL transmittance, the full span of $\theta_w$ (0-180°) can be differentiated by "splining" the measured transmittance intensities from a minimum of only three different LPL images. See F. C. Alegria, *Measurement* 42, 748 (2009). While any three values of $\theta_{LPL}$ can be used, maximum resolution over all possible $\theta_w$ is achieved comparing $I_{obs}$ at 45° increments (e.g., $\theta_{LPL}$=0, 45, and 90°). Of note, although three images are required to distinguish the maximum range of relative angles 0-180° (e.g., 45° and 135° would be indistinguishable with only two LPL images), it is possible to distinguish relative $\theta_w$ between 0-90° fitting only two images.

Figure 8A:
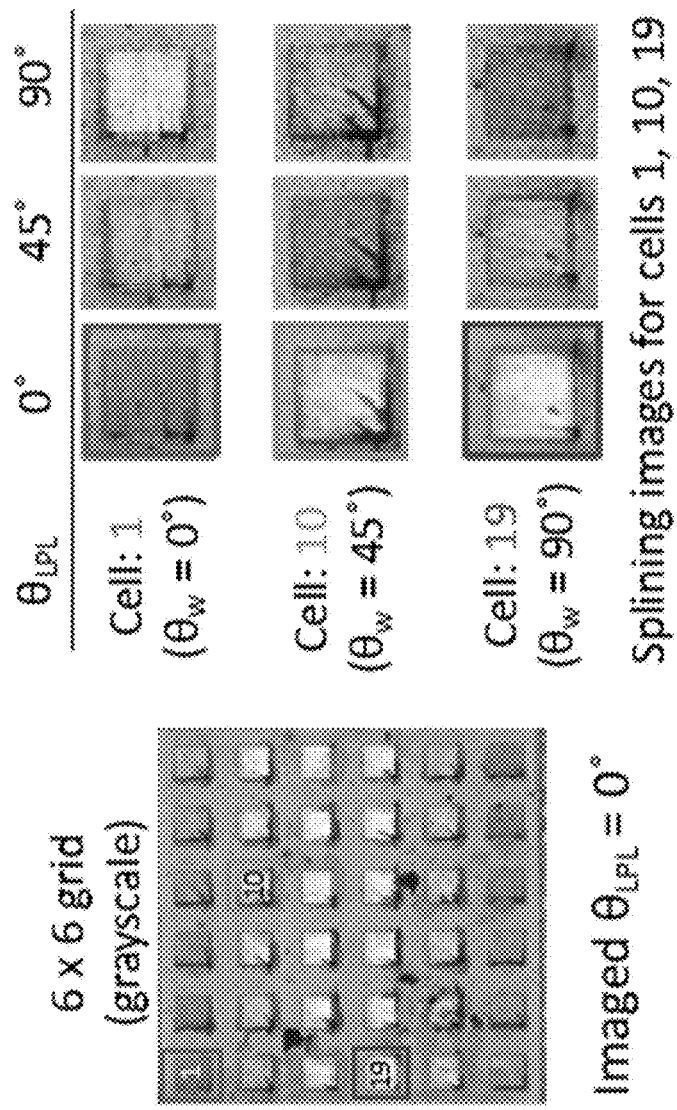
FIG. 8(a) is a 36-cell grid imaged in black and white ($\theta_{LPL}$=0°) and representative LPL images ($\theta_{LPL}$=0, 45, and 90°) used for splining of three individual cells.
Figure 8B:
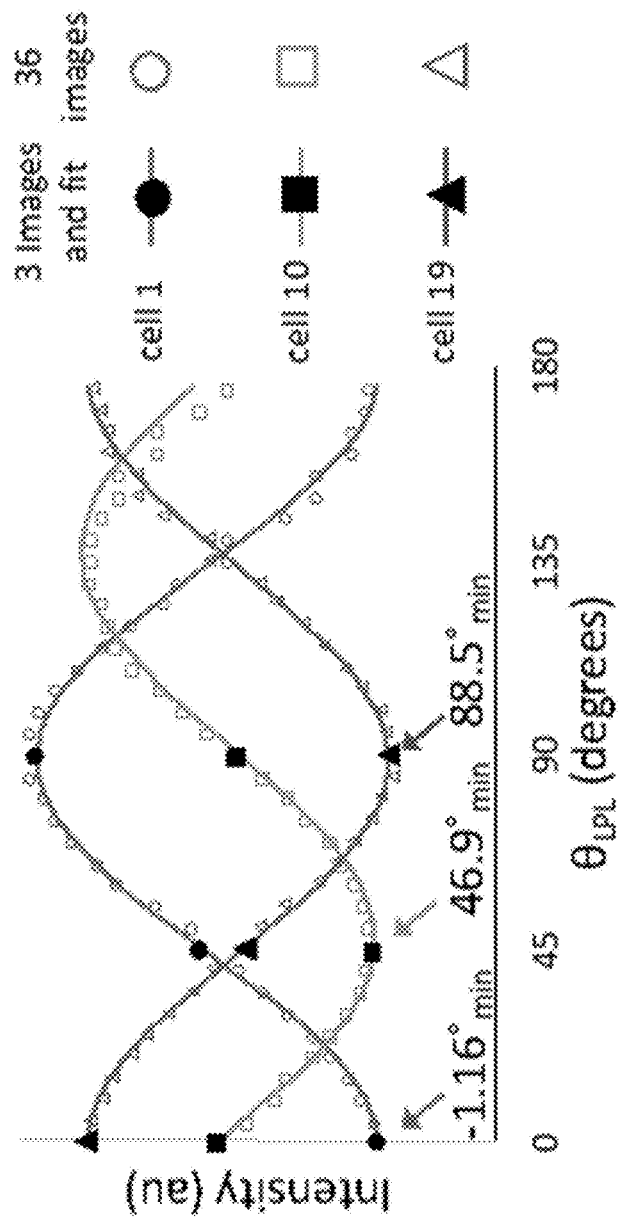
FIG. 8(b) is a graph of intensity ($I_{obs}$) vs $\theta_{LPL}$ for grid cell 1, 10, and 19. The figure shows the measured intensity of the splining images in FIG. 8(a) (solid symbols), their three-image fit (solid lines), and an overlay of the measured intensity at 5° intervals (open symbols).

With this consideration, the minimum difference in alignment direction that can be reliably distinguished in patterned DACLC polarizers was determined using the splining technique. Two 6×6 grids were prepared with 50×50 µm cells aligned in 5° increments from 0-175°, as shown in FIG. 8(a). Considering only three M-LPI images of each 36-cell grid ($\theta_{LPL}$=0, 45, and 90°; solid symbols in FIG. 8(b)), the relative direction of DACLC alignment in each of the 72 cells was calculated by the splining technique (solid lines in FIG. 8(b)). These values were compared to the actual write angles for accuracy ($\theta_{w\text{-}calc} - \theta_w$), showing an average difference of −0.47°±2.61° (n=78). This can be related to an accuracy range with a t-distribution, and yields a predicted accuracy of 93.78%, 99.44%, and 99.97% for $\theta_{w\text{-}calc}$ within a 10°, 15°, and 20° resolution window respectively. Importantly, the calculated $\theta_w$ values from splining only three M-LPI images were of negligible difference compared to $\theta_w$ values calculated with a sine-fit of 36 M-LPI images taken in 5° increments (open symbols in FIG. 8(b)). Thus, retrieval of written alignment angles can be practically achieved with minimal loss in resolution using only three M-LPI images.

Figures 8C, 8D:
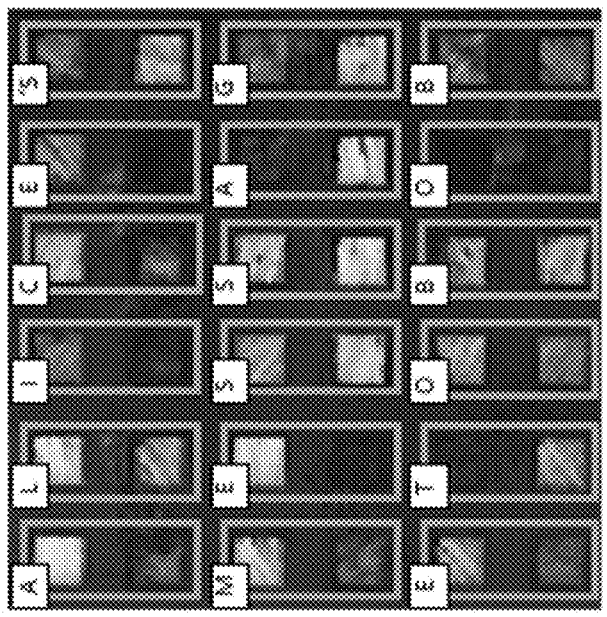
FIG. 8(c) is an Illustration of the dyad encoding scheme.
FIG. 8(d) is a base-10 encoded DACLC film and data retrieval of "ALICE'S_MESSAGE_TO_BOB".

To illustrate write-read capability, a data encoding and retrieval process using DACLC grids was designed. With a $\theta_w$ resolution of 10°, there are 19 possible identities for each cell (i.e., base-19): each of eighteen 10° increments from 0-170°, or isotropic. These base-19 "bits" were paired as dyads, each able to store $19^2$=361 possible data states. Each dyad was then coded to a text character (e.g., "D" in FIG. 8(c) and Table 1). The text-based code was used to transcribe a message as a 6×6 DACLC grid, which was then independently imaged at $\theta_{LPL}$=0, 45, and 90° to retrieve and decode the message "ALICE'S_MESSAGE_TO_BOB" (Table 2). A single error in decoding (C→B) was observed, consistent with the 93.8% accuracy described above for 10° resolution and easily addressed in practice using redundant encoding. To illustrate the available trade-off between storage density and readout accuracy per bit, the same DACLC film was re-interpreted without error using an effective $\theta_w$ resolution of 20° (i.e., base-10) (FIG. 8(d) and Table 2). Thus, information encoding with this system can use any angle-resolution scheme while considering that increasing retrieval accuracy (using larger angle increments) decreases data capacity per bit. In general, the method need not use a regular or ordered grid or array of cells but can use any arbitrary arrangement comprising a plurality of cells.

Modular Molecular Composition: "Degradation" of CT Absorption (and Dichroism)

Figure 9A:
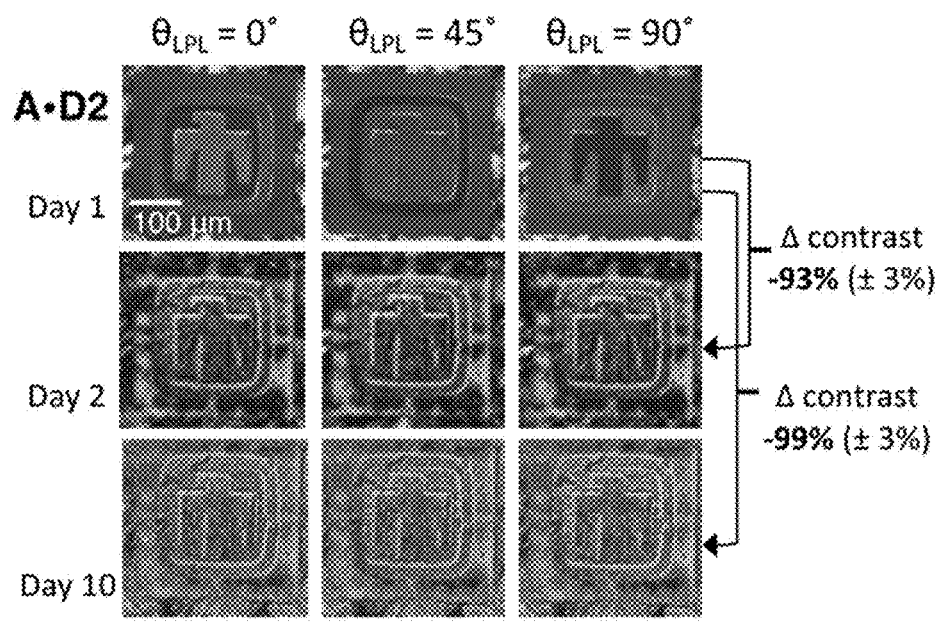
FIGS. 9(a)-9(b) show molecular component-dependent lifetime of encoded information shown in time-lapse images taken 2 and 10 days after laser-writing of an image on two different DACLC films.
Figure 9B:
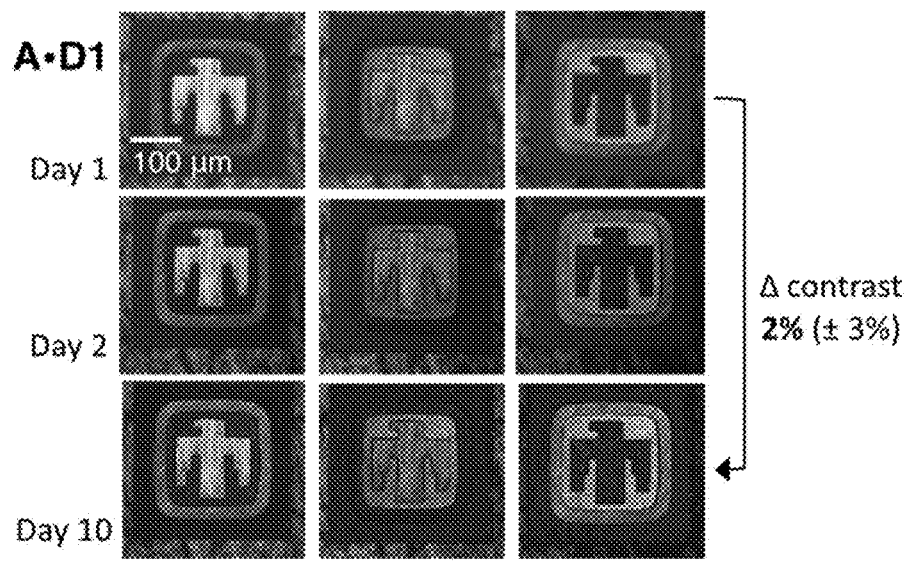

While most DACLC materials exhibit strong CT absorption in at least one Col phase that is largely independent of the side-chains, the persistence of CT absorption in these materials at room temperature can vary through alteration of side-chain structure. See A. G. Bé et al., *Org. Lett.* 17, 4834 (2015); P. M. Alvey et al., *J. Org. Chem.* 75, 7682 (2010); and J. J. Reczek et al., *J. Am. Chem. Soc.* 128, 7995 (2006). For example, the dichroic properties of laser-written samples of A:D2 (hexyl chains on the donor) were observed to fade in a matter of days, while samples of A:D1 (propyl chains of donor) maintain dichroic properties indefinitely—shown here using time-lapse imaging of written DACLC films. Films of A:D2 display high contrast on initial writing, but the ability to distinguish between differently aligned regions by optical transmission diminishes over the course of several days and is lost by day 10, as shown in FIG. 9(a). However, the contrast between differently aligned regions in films comprised of A:D1 shows no loss of contrast at 10 days, as shown in FIG. 9(b), and appears to persist indefinitely when kept under ambient conditions (i.e., no alteration of contrast was observed in the A:D1 film for over 18 months). This tunable persistence achieved via molecular design can provide a predictable life-span for information encoded in DACLCs, offering an additional level of security via autonomous self-destruction.

The present invention has been described as a polarization-based coding/encryption using organic charge transfer materials. It will be understood that the above description is merely illustrative of the applications of the principles of the present invention, the scope of which is to be determined by the claims viewed in light of the specification. Other variants and modifications of the invention will be apparent to those of skill in the art.

TABLE 1

Dyad encoding scheme. Note that each character value corresponds redundantly to six dyads, and that each of six dyads corresponds uniquely to a single character value. Dyads used in the example message, "ALICE'S_MESSAGE_TO_BOB" (FIG. 8(d)), are shown in bold.

| Character value | Dyad 1 | Dyad 2 | Dyad 3 | Dyad 4 | Dyad 5 | Dyad 6 |
|---|---|---|---|---|---|---|
| A | 20, 140 | 10, 140 | 0, 60 | 40, 130 | 100, 10 | 110, 20 |
| B | 10, 90 | 140, 50 | 70, 10 | 80, 0 | 90, 10 | 170, 70 |
| C | 50, 140 | 160, 70 | 90, 130 | 120, 10 | 10, 110 | 170, 140 |
| D | 60, 140 | 50, 80 | 70, 50 | 160, 50 | 130, 90 | 150, 100 |

TABLE 1-continued

Dyad encoding scheme. Note that each character value corresponds redundantly to six dyads, and that each of six dyads corresponds uniquely to a single character value. Dyads used in the example message, "ALICE'S_MESSAGE_TO_BOB" (FIG. 8(d)), are shown in bold.

| Character value | Dyad 1 | Dyad 2 | Dyad 3 | Dyad 4 | Dyad 5 | Dyad 6 |
|---|---|---|---|---|---|---|
| E | 50, 70 | 140, 140 | 50, 90 | 80, 120 | 10, 100 | 40, 30 |
| F | 10, 130 | 20, 30 | 10, 30 | 140, 80 | 160, 140 | 90, 120 |
| G | 140, 120 | 60, 120 | 150, 0 | 120, 110 | 80, 150 | 130, 10 |
| H | 10, 150 | 80, 70 | 50, 10 | 160, 120 | 90, 70 | 160, 150 |
| I | 170, 80 | 130, 80 | 170, 170 | 170, 20 | 110, 40 | 40, 0 |
| J | 50, 0 | 80, 10 | 60, 100 | 100, 90 | 170, 120 | 60, 30 |
| K | 70, 0 | 130, 60 | 90, 20 | 160, 170 | 10, 160 | 0, 50 |
| L | 120, 30 | 100, 130 | 20, 40 | 120, 100 | 60, 110 | 20, 100 |
| M | 30, 0 | 80, 30 | 0, 20 | 50, 50 | 90, 30 | 170, 130 |
| N | 70, 90 | 140, 160 | 30, 130 | 0, 150 | 70, 130 | 70, 80 |
| O | 80, 80 | 150, 50 | 150, 140 | 120, 80 | 0, 10 | 90, 110 |
| P | 30, 140 | 170, 30 | 60, 60 | 0, 100 | 50, 100 | 20, 170 |
| Q | 100, 30 | 110, 170 | 40, 40 | 150, 90 | 110, 120 | 130, 0 |
| R | 30, 50 | 120, 0 | 120, 20 | 60, 40 | 110, 150 | 140, 10 |
| S | 120, 170 | 160, 90 | 150, 40 | 140, 170 | 160, 0 | 130, 110 |
| T | 40, 10 | 40, 50 | 30, 170 | 30, 70 | 30, 150 | 120, 120 |
| U | 70, 20 | 140, 130 | 120, 150 | 130, 70 | 50, 160 | 70, 70 |
| V | 110, 130 | 100, 150 | 120, 40 | 50, 120 | 20, 10 | 130, 30 |
| W | 110, 60 | 70, 160 | 40, 80 | 90, 90 | 140, 60 | 100, 60 |
| X | 80, 140 | 110, 30 | 40, 160 | 20, 50 | 80, 170 | 170, 150 |
| Y | 80, 60 | 0, 160 | 130, 40 | 120, 60 | 70, 40 | 170, 100 |
| Z | 110, 140 | 160, 110 | 40, 70 | 150, 130 | 0, 130 | 100, 120 |
| _A | 130, 120 | 140, 20 | 80, 110 | 20, 90 | 160, 60 | 80, 100 |
| _B | 10, 170 | 170, 110 | 60, 70 | 40, 90 | 170, 160 | 30, 160 |
| _C | 150, 20 | 30, 10 | 150, 120 | 160, 100 | 30, 80 | 130, 50 |
| _D | 100, 160 | 100, 170 | 70, 170 | 170, 50 | 140, 0 | 160, 160 |
| _E | 50, 130 | 50, 20 | 110, 50 | 60, 80 | 130, 170 | 0, 70 |
| _F | 50, 60 | 90, 60 | 160, 10 | 130, 130 | 70, 110 | 40, 100 |
| _G | 30, 40 | 110, 110 | 120, 140 | 50, 150 | 120, 160 | 150, 150 |
| _H | 40, 60 | 150, 160 | 70, 150 | 110, 100 | 140, 30 | 100, 70 |
| _I | 0, 40 | 130, 20 | 20, 110 | 90, 160 | 120, 130 | 90, 140 |
| _J | 150, 10 | 50, 170 | 20, 160 | 30, 30 | 10, 20 | 170, 40 |
| _K | 10, 60 | 140, 40 | 20, 150 | 140, 150 | 160, 130 | 100, 40 |
| _L | 60, 0 | 20, 0 | 150, 80 | 30, 90 | 10, 120 | 20, 120 |
| _M | 100, 0 | 30, 120 | 40, 110 | 70, 120 | 110, 90 | 40, 170 |
| _N | 90, 150 | 10, 80 | 150, 110 | 100, 20 | 60, 10 | 30, 60 |
| _O | 40, 150 | 20, 130 | 40, 140 | 10, 70 | 20, 60 | 60, 150 |
| _P | 100, 110 | 150, 30 | 50, 30 | 100, 80 | 80, 160 | 10, 0 |
| _Q | 50, 110 | 110, 10 | 20, 70 | 140, 110 | 70, 30 | 0, 140 |
| _R | 0, 0 | 60, 160 | 170, 10 | 110, 0 | 170, 0 | 90, 100 |
| _S | 110, 160 | 10, 40 | 70, 140 | 150, 170 | 60, 170 | 70, 100 |
| _T | 70, 60 | 160, 20 | 100, 50 | 80, 40 | 120, 70 | 20, 80 |
| _U | 140, 100 | 60, 50 | 0, 30 | 0, 170 | 40, 120 | 120, 50 |
| _V | 130, 100 | 40, 20 | 100, 100 | 10, 50 | 50, 40 | 110, 70 |
| _W | 90, 40 | 80, 90 | 20, 20 | 90, 50 | 0, 120 | 0, 80 |
| _X | 30, 110 | 10, 10 | 30, 20 | 60, 130 | 130, 160 | 0, 90 |
| _Y | 0, 110 | 170, 60 | 160, 80 | 120, 90 | 140, 70 | 60, 90 |
| _Z | 110, 80 | 140, 90 | 160, 40 | 30, 100 | 150, 60 | 80, 130 |
| 'S | 100, 140 | 60, 20 | 90, 170 | 170, 90 | 130, 150 | 150, 70 |
| 'T | 90, 80 | 130, 140 | 80, 20 | 160, 30 | 80, 50 | 90, 0 |

TABLE 2

Encoded message readout accuracy using base-10 and base-19 encoding schemes. Using a base-10 encoding scheme (such that exact readout angle is rounded to the nearest 20° increment; in this case, because the encoding scheme is defined in 10° increments, readout is considered to be "correct" if it falls within 10° of the actual written angle), readout of the encoded message is perfectly accurate. Using a base-19 encoding scheme (such that exact readout angle is rounded to the nearest 10° increment), readout is near-perfect, with one error in 36 readings. Redundancies built into the cipher (Table 1) were not leveraged to obscure any erroneous readout.

| Written Angle (°) | | | | | |
|---|---|---|---|---|---|
| 0 | 20 | 130 | 160 | 50 | 60 |
| 60 | 40 | 80 | 70 | 90 | 20 |
| 30 | 10 | 140 | 160 | 110 | 130 |
| 120 | 100 | 170 | 0 | 20 | 10 |
| 50 | 80 | 150 | 30 | 90 | 140 |
| 70 | 40 | 140 | 160 | 110 | 50 |
| Angle Readout (°) | | | | | |
| 0.3 | 18.3 | 127.0 | 165.6 | 48.1 | 58.6 |
| 59.4 | 41.0 | 79.0 | 68.0 | 88.1 | 18.1 |
| 26.3 | 8.2 | 141.5 | 161.5 | 109.8 | 129.1 |
| 117.3 | 98.5 | 174.5 | 179.8 | 17.9 | 8.2 |
| 46.9 | 77.5 | 149.0 | 26.5 | 91.2 | 143.5 |
| 72.4 | 39.4 | 140.3 | 164.8 | 106.8 | 47.8 |

We claim:

1. A method for reading an optical code, comprising:
   optically encoding a grayscale image intended to be viewed with a chosen angle of linearly polarized light in an organic charge-transfer film, comprising:
      providing a film comprising an organic charge-transfer material, and
      writing a pattern within the film with an optical source, in which the pattern comprises at least two different dichroic regions, wherein each of the at least two different dichroic regions is written with a different write angle;
   illuminating the film with linearly polarized light at the chosen angle; and
   viewing the light transmitted through the film to reveal the encoded grayscale image.

2. The method of claim 1, wherein each dichroic region comprises an optically anisotropic phase comprising a plurality of domains arranged in an aligned columnar phase characterized by a columnar director.

3. The method of claim 2, wherein each of the plurality of domains comprises a donor moiety and an acceptor moiety.

4. The method of claim 3, wherein the donor moiety comprises a structure of any one of (I), (Ia), (II), (IIa), (III), (IIIa), (IV), (IVa), (V), (Va), (VI), and (VII):

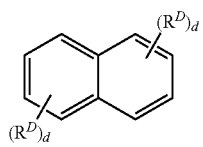
(I)

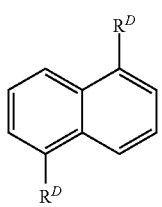
(Ia)

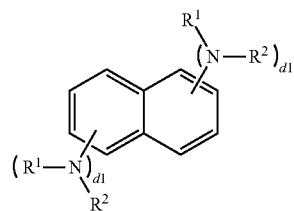
(II)

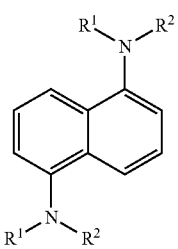
(IIa)

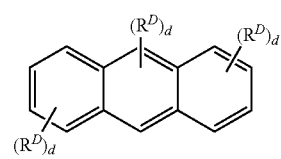
(III)

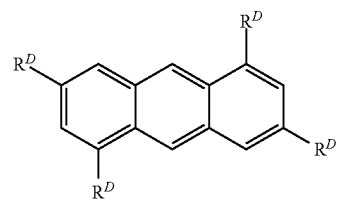
(IIIa)

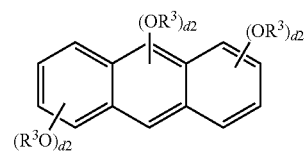
(IV)

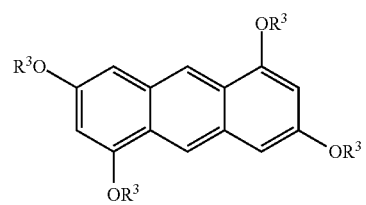
(IVa)

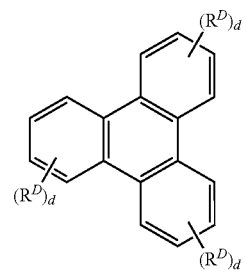
(V)

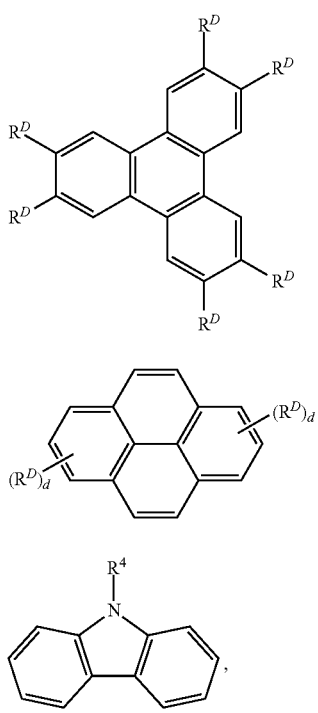

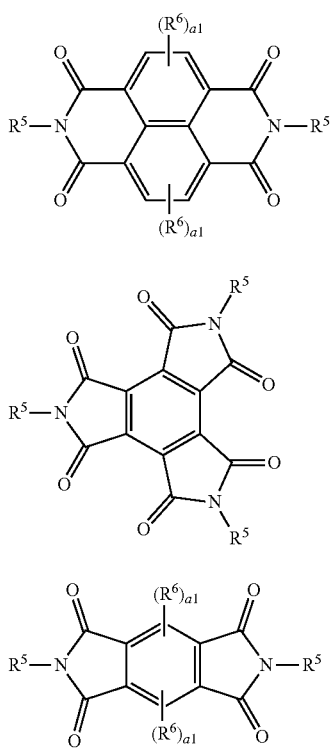

or a salt thereof.

5. The method of claim 3, wherein the acceptor moiety comprises a structure of any one of (VIII), (IX), (X), (XI), (XII), and (XIII):

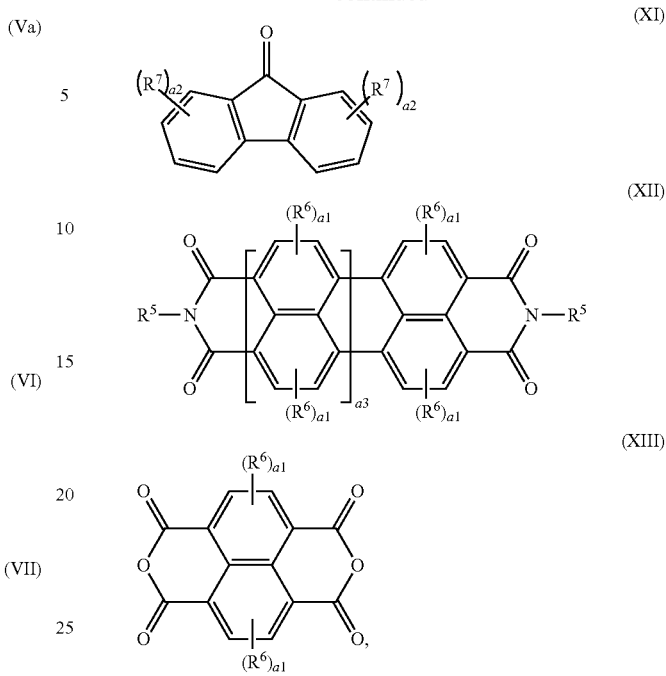

or a salt thereof.

6. The method of claim 3, wherein the donor moiety comprises 3,5-di-propyl-aminonapthalene or a 1,5-di-hexyl-aminonapthalene and the acceptor moiety comprises N,N'-dioctyl naphthalenediimide.

7. A method for optical encryption, comprising:
providing a mask comprising a film of an organic charge-transfer material having a pattern optically written within the film, wherein the pattern comprises one or more dichroic pixels, wherein each of the one or more dichroic pixels is written with a different write angle, and wherein the one or more dichroic pixels are written to contain encrypted information;
providing a key comprising a film of an organic charge-transfer material having a pattern optically written within the film, wherein the pattern comprises one or more dichroic pixels, wherein each of the one or more dichroic pixels is written with a different write angle, and wherein the one or more dichroic pixels are written to decrypt the encrypted information in the mask;
overlaying the mask and the key to overlay the pixels of the mask with the pixels of the key; and
illuminating the overlaid mask and key with unpolarized light so as to transmit light through overlaid mask and key pixels with similar write angles and block light transmission through overlaid mask and key pixels with orthogonal write angles, thereby revealing the information in a transmitted image.

8. The method of claim 7, wherein each dichroic pixel comprises an optically anisotropic phase comprising a plurality of domains arranged in an aligned columnar phase characterized by a columnar director.

9. The method of claim 8, wherein each of the plurality of domains comprises a donor moiety and an acceptor moiety.

10. The method of claim 9, wherein the donor moiety comprises a structure of any one of (I), (Ia), (II), (IIa), (III), (IIIa), (IV), (IVa), (V), (Va), (VI), and (VII):

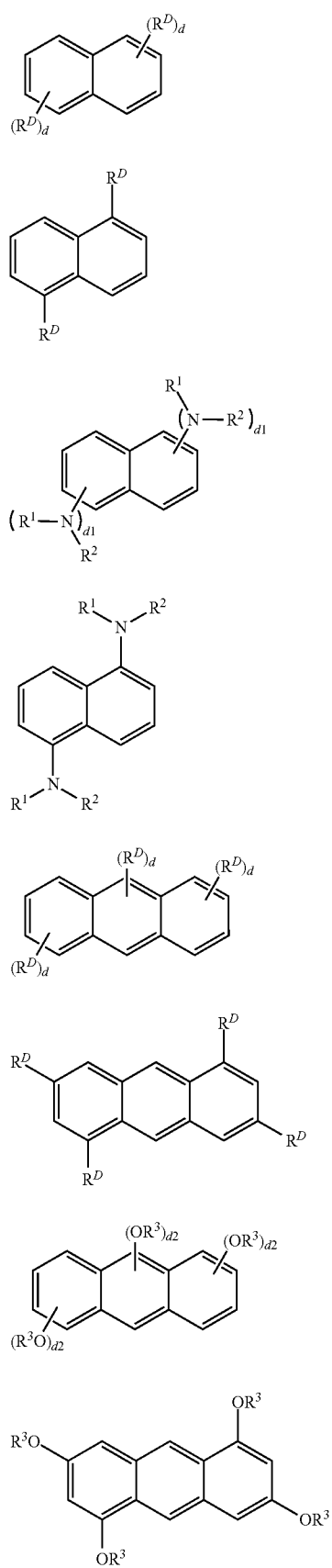
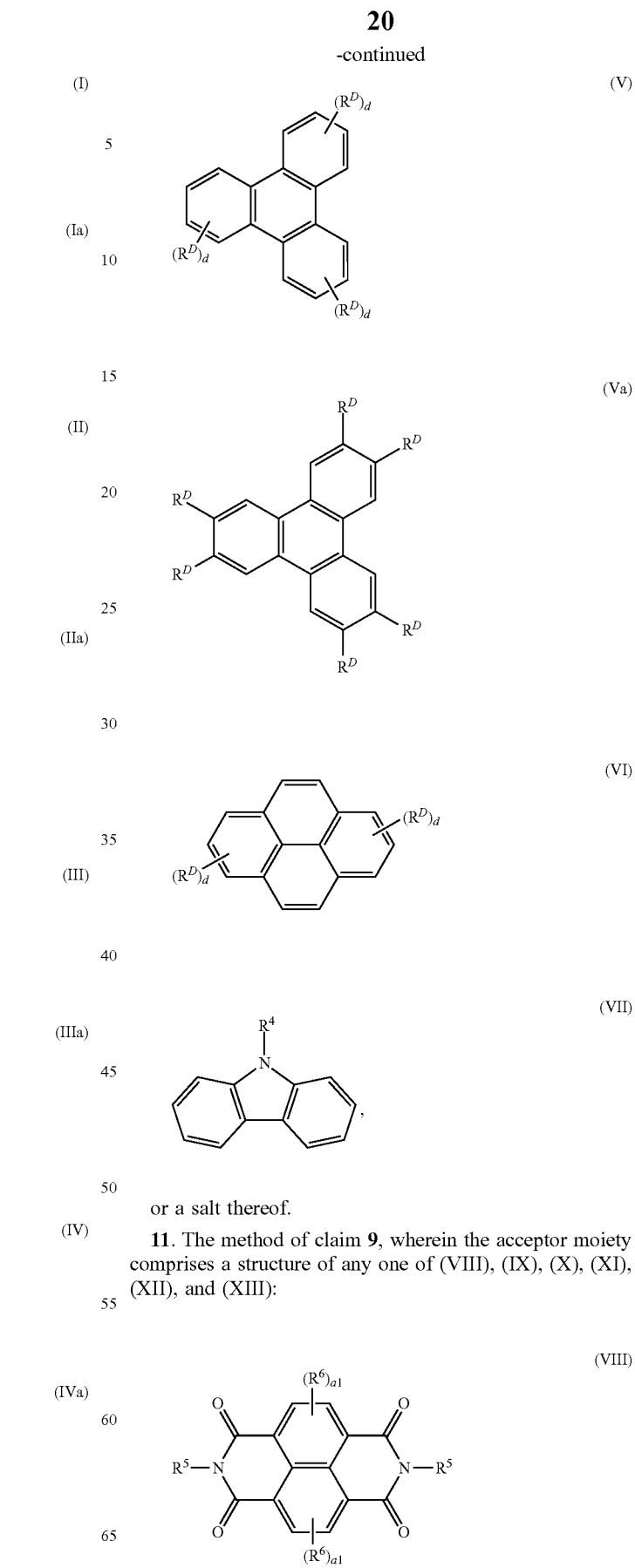
or a salt thereof.
11. The method of claim 9, wherein the acceptor moiety comprises a structure of any one of (VIII), (IX), (X), (XI), (XII), and (XIII):

-continued

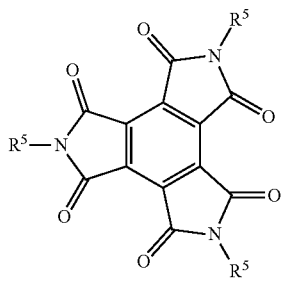
(IX)

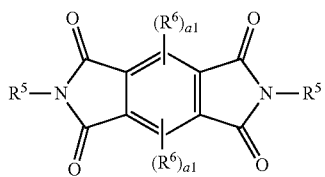
(X)

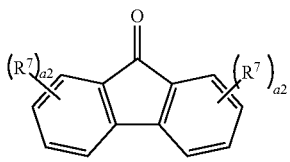
(XI)

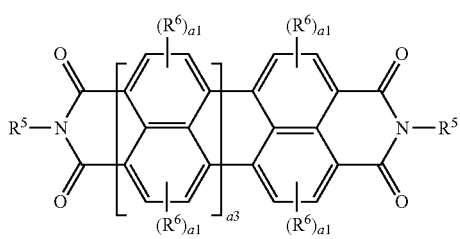
(XII)

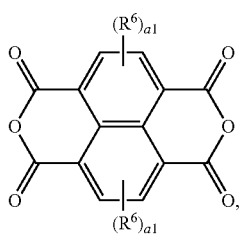
(XIII)

or a salt thereof.

12. The method of claim 9, wherein the donor moiety comprises 1,5-di-propyl-aminonapthalene or a 1,5-di-hexyl-aminonapthalene and the acceptor moiety comprises N,N'-dioctyl naphthalenediimide.

13. A method for encoding and retrieving a message, comprising:
providing a film Comprising an organic charge-transfer material;
writing an arrangement within the film with an optical source, in which the arrangement comprises a plurality of dichroic cells, wherein each of the plurality of dichroic cells is written with a different write angle from each of the other dichroic cells in the arrangement, thereby encoding a message;
pairing different dichroic cells to provide a plurality of unique dyads, each storing a different data state;
coding each unique dyad to a text character;
independently imaging the light transmitted by the arrangement when the film is illuminated by incident linearly polarized light at each of at least three different illumination angles;
determining the write angles for each of the dichroic cells from the at least three independent grid images, thereby identifying the unique dyads that contain the encoded message; and
decoding the message by determining the text character for each of the identified unique dyads.

14. The method of claim 13, wherein each dichroic region comprises an optically anisotropic phase comprising a plurality of domains arranged in an aligned columnar phase characterized by a columnar director.

15. The method of claim 14, wherein each of the plurality of domains comprises a donor moiety and an acceptor moiety.

16. The method of claim 15, wherein the donor moiety comprises a structure of any one of (I), (Ia), (II), (IIa), (III), (IIIa), (IV), (IVa), (V), (Va), (VI), and (VII):

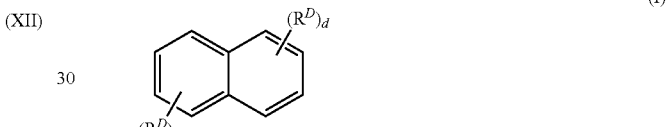
(I)

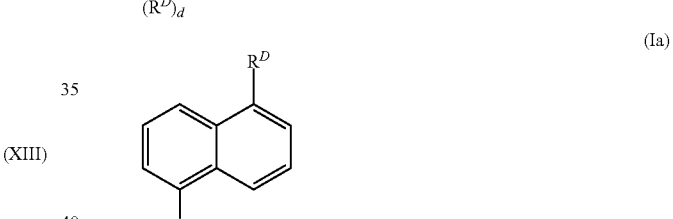
(Ia)

(II)

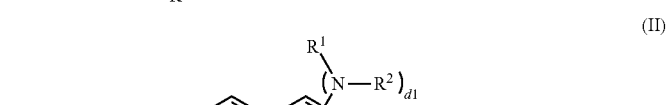

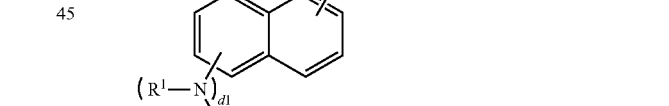
(IIa)

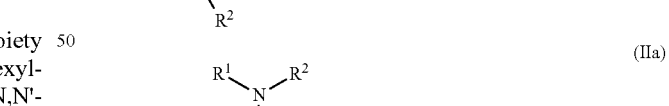
(III)

-continued
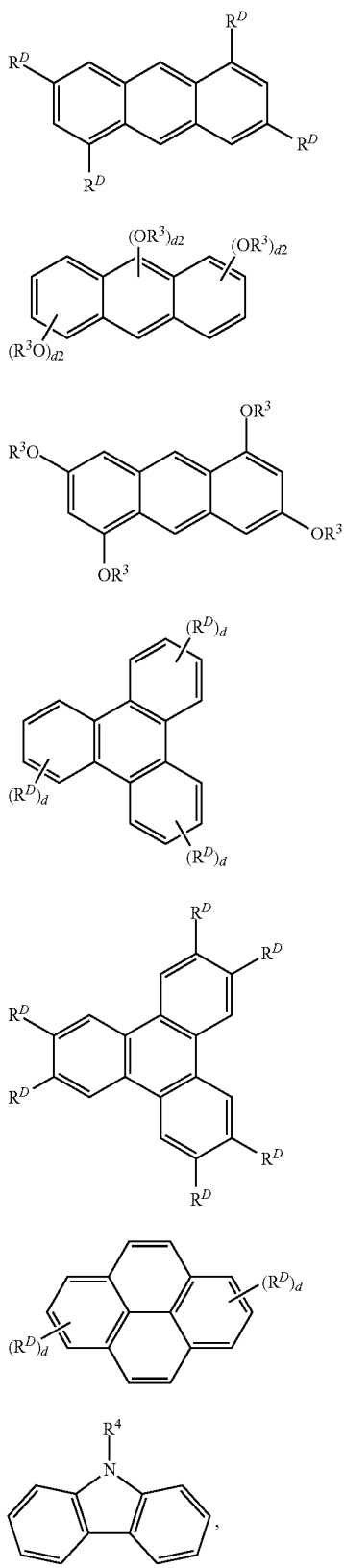
or a salt thereof.
17. The method of claim 15, wherein the acceptor moiety comprises a structure of any one of (VIII), (IX), (X), (XI), (XII), and (XIII):
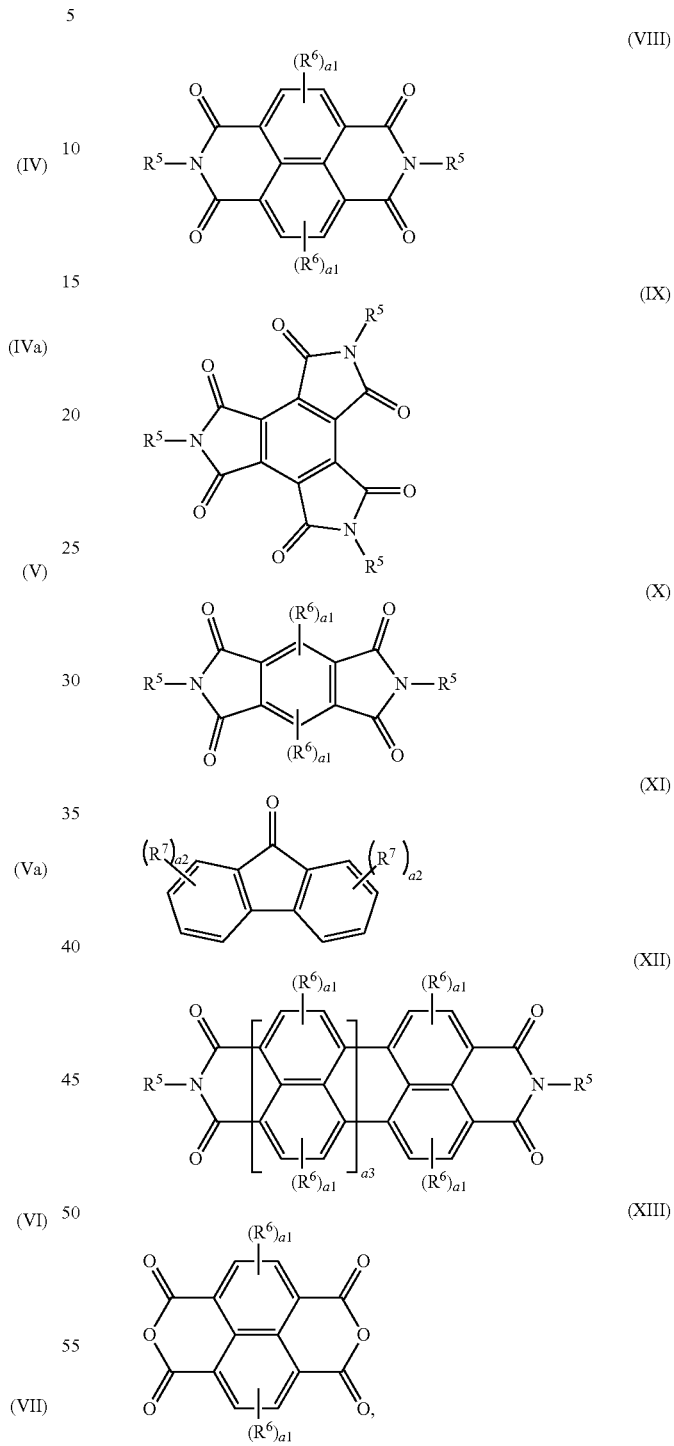
or a salt thereof.
18. The method of claim 15, wherein the donor moiety comprises 1,5-di-propyl-aminonapthalene or a 1,5-di-hexyl-aminonapthalene and the acceptor moiety comprises N,N'-dioctyl naphthalenediimide.
* * * * *